(12) United States Patent
Kishita et al.

(10) Patent No.: US 10,680,544 B2
(45) Date of Patent: Jun. 9, 2020

(54) POWER CONVERSION DEVICE AND AIR CONDITIONER

(71) Applicant: HITACHI-JOHNSON CONTROLS AIR CONDITIONING, INC., Tokyo (JP)

(72) Inventors: Ken Kishita, Tokyo (JP); Dongsheng Li, Tokyo (JP); Rei Kasahara, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 16/088,944

(22) PCT Filed: Oct. 24, 2017

(86) PCT No.: PCT/JP2017/038401
§ 371 (c)(1),
(2) Date: Sep. 27, 2018

(87) PCT Pub. No.: WO2018/084027
PCT Pub. Date: May 11, 2018

(65) Prior Publication Data
US 2019/0131903 A1 May 2, 2019

(30) Foreign Application Priority Data
Nov. 4, 2016 (JP) .................. 2016-215919

(51) Int. Cl.
*H02P 27/12* (2006.01)
*H02P 21/00* (2016.01)
(Continued)

(52) U.S. Cl.
CPC .......... *H02P 21/0089* (2013.01); *F24F 11/86* (2018.01); *H02M 7/48* (2013.01); *H02P 21/22* (2016.02); *H02P 27/12* (2013.01)

(58) Field of Classification Search
CPC .......... H02P 21/06; H02P 21/22; H02P 27/04; H02P 6/08; H02P 21/0089; H02P 21/14; H02P 2207/03; G05B 11/36
See application file for complete search history.

(56) References Cited

U.S. PATENT DOCUMENTS

| | | | |
|---|---|---|---|
| 8,269,441 B2 * | 9/2012 | Morimoto | ............... H02P 21/06 318/400.02 |
| 2004/0239202 A1 | 12/2004 | Dooley | |

(Continued)

FOREIGN PATENT DOCUMENTS

| | | |
|---|---|---|
| CN | 1482734 A | 3/2004 |
| CN | 101111982 A | 1/2008 |

(Continued)

OTHER PUBLICATIONS

International Search Report of PCT/JP2017/038401 dated Jan. 16, 2018.

(Continued)

*Primary Examiner* — Rina I Duda
(74) *Attorney, Agent, or Firm* — Mattingly & Malur, PC

(57) ABSTRACT

In order to achieve a power conversion device with which a motor can be stably driven, a power conversion device is provided with: an inverter, which converts supplied DC voltage to an AC output voltage and supplies the AC output voltage to windings, and which, in accordance with the DC voltage, changes the saturation level at which the output voltage is saturated, in order to drive a motor equipped with a stator having the windings and a rotor having permanent magnets; and a controller which, when the output voltage is lower than the saturation level, increases the output current of the inverter such that a magnetic flux that weakens or strengthens the magnetic flux generated by the permanent (Continued)

magnets is generated in the windings. An air conditioner including the power conversion device is also disclosed.

5 Claims, 21 Drawing Sheets

(51) Int. Cl.
    *F24F 11/86*     (2018.01)
    *H02P 21/22*     (2016.01)
    *H02M 7/48*     (2007.01)

(56) References Cited

U.S. PATENT DOCUMENTS

| | | |
|---|---|---|
| 2004/0239203 A1 | 12/2004 | Bell et al. |
| 2005/0242785 A1 | 11/2005 | Dooley |
| 2006/0113967 A1 | 6/2006 | Dooley |
| 2006/0226721 A1 | 10/2006 | Dooley et al. |
| 2007/0024249 A1 | 2/2007 | Dooley |
| 2007/0170885 A1* | 7/2007 | Morimoto ......... H02M 7/53875 318/811 |
| 2007/0241715 A1* | 10/2007 | Fujiwara ................ H02P 21/14 318/609 |
| 2008/0079401 A1 | 4/2008 | Dooley |
| 2009/0195225 A1 | 8/2009 | Dooley et al. |
| 2009/0278413 A1 | 11/2009 | Dooley |
| 2010/0148622 A1 | 6/2010 | Dooley |
| 2014/0042938 A1 | 2/2014 | Shoji et al. |
| 2015/0022127 A1 | 1/2015 | Takahashi |
| 2017/0264225 A1 | 9/2017 | Ishikawa et al. |

FOREIGN PATENT DOCUMENTS

| | | |
|---|---|---|
| EP | 2 211 457 A1 | 7/2010 |
| EP | 2 618 480 A2 | 7/2013 |
| JP | 2004-101151 A | 4/2004 |
| JP | 2010-142030 A | 6/2010 |
| WO | 2016/017304 A1 | 2/2016 |

OTHER PUBLICATIONS

Extended European Search Report received in corresponding European Application No. 17867154.1 dated Sep. 6, 2019.

Chinese Office Action received in corresponding Chinese Application No. 201780020568.1 dated Aug. 12, 2019.

* cited by examiner

POWER CONVERSION DEVICE AND AIR CONDITIONER

TECHNICAL FIELD

The present invention relates to a power conversion device and an air conditioner.

BACKGROUND ART

The Abstract of the following Patent Literature 1, which relates to a technology of weak field control for a permanent magnet synchronous motor, recites "To smoothly switch between vector control featuring a current command calculation unit and voltage phase operation type weak field control, and to improve the efficiency in switching" and "The problem is solved by any one of followings or combination of them. 1. A step is provided for reducing a voltage phase acquired from intermediate voltage command values $V_{dc}^*$ and $V_{qc}^*$ when switching from normal control to voltage phase operation type weak field control. 2. A value acquired by averaging d-axis current detection values is taken as a first d-axis current command value to be input in a d-axis current command calculation unit when returning to the normal control from the voltage phase operation type weak field control. 3. The gain of the d-axis current command calculation unit is switched when returning to the normal control from the voltage phase operation type weak field control. 4. A motor constant (resistance, inductance, power generation constant) identification calculation unit is provided in addition to the normal control and voltage phase operation type weak field control".

CITATION LIST

Patent Literature

Patent Literature 1: Japanese Patent Application Publication No. 2010-142030

SUMMARY OF INVENTION

Technical Problem

Here, it is assumed that AC voltage from, for instance, a commercial power source is converted to DC voltage by using a converter circuit; the DC voltage is further converted to AC voltage with each given frequency by an inverter device; and the AC voltage is used to drive a permanent magnet synchronous motor (hereinafter, referred to as a "motor"). When the AC voltage from a commercial power source has distortions and/or when a cheap converter circuit is used, the DC voltage output from the converter circuit has convoluted ripple components. The ripple components of the DC voltage may cause an ON/OFF state of weak field control to be switched frequently. This switching induces distortion in the output voltage or current of the inverter device, thereby making the motor unstable. This may cause problems such as a stoppage due to overcurrent, malfunctions, a rapid change in the rotation speed.

The present invention has been made in view of the above-mentioned situations. The purpose of the present invention is to provide a power conversion device allowing for stable operation of motors and an air conditioner therewith.

Solution to Problem

An aspect of the present invention provides a power conversion device comprising:

an inverter which converts, in order to drive a motor equipped with a stator having windings and a rotor having permanent magnets, supplied DC voltage to an AC output voltage and supplies the AC output voltage to the windings, wherein, a saturation level at which the output voltage is saturated changes in accordance with the DC voltage; and a controller which, when the output voltage is lower than the saturation level, increases an output current of the inverter to generate in the windings a magnetic flux in such a direction as to weaken or strengthen a magnetic flux generated by the permanent magnets.

Advantageous Effects of Invention

The present invention enables motors to be driven stably.

DESCRIPTION OF EMBODIMENTS

First Embodiment

The following describes, in detail, a motor drive system S1 according to the first embodiment of the present invention.

Figure 1:
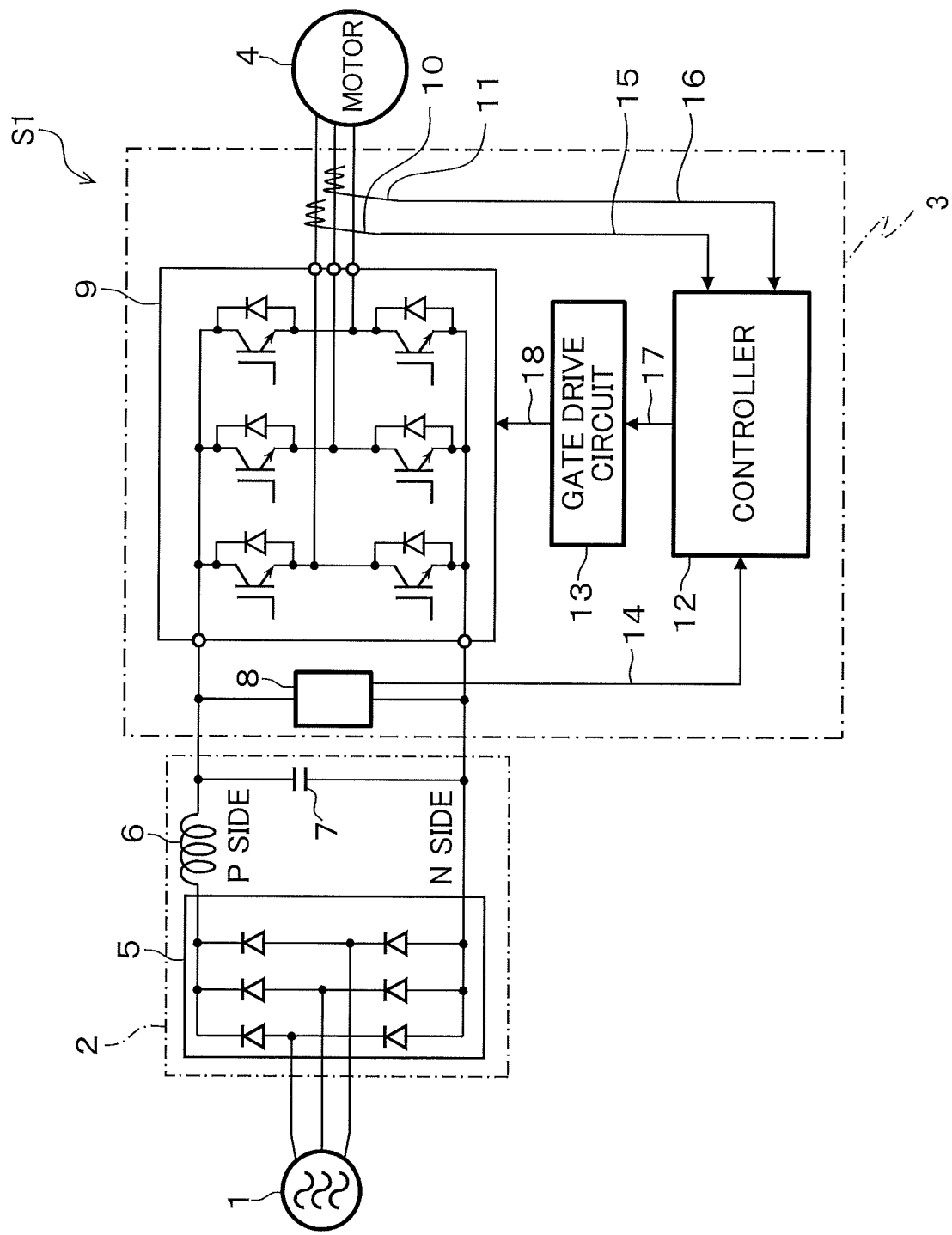
FIG. 1 is a block diagram showing a motor drive system according to a first embodiment of the present invention.

FIG. 1 is a block diagram showing the motor drive system S1 according to the first embodiment of the present invention. In FIG. 1, the motor drive system S1 includes: a converter circuit 2 in which AC voltage from an AC voltage source 1 is converted to DC voltage; an inverter device 3 (power conversion device); and a permanent magnet synchronous motor 4 (hereinafter, referred to as a motor 4). The motor 4 is provided with a rotor having permanent magnets embedded (not shown) and a stator having windings (not shown). The AC voltage source 1 supplies 3-phase AC voltage to the converter circuit 2.

The converter circuit 2 includes a 3-phase diode bridge 5, a DC reactor 6, and a smoothing capacitor 7. When 3-phase AC voltage is supplied from the AC voltage source 1 to the 3-phase diode bridge 5, the 3-phase diode bridge 5 outputs full-wave-rectified voltage. The 3-phase diode bridge 5 outputs the voltage on the P side and the N side. The P side is connected to the DC reactor 6. The smoothing capacitor 7 is connected to the DC reactor 6 output side and the 3-phase diode bridge 5 output N side. Then, the converter circuit 2 outputs, as a DC voltage, an inter-terminal voltage of the smoothing capacitor 7.

The DC voltage output from the converter circuit 2 is input into the inverter device 3. The inverter device 3 includes: a DC voltage detection circuit 8; an intelligent power module (IPM) 9 with an inverter function; a U-phase motor current detection circuit 10; a V-phase motor current detection circuit 11; a controller 12; and a gate drive circuit 13.

The DC voltage supplied from the converter circuit 2 is input into the IPM 9 (inverter). The IPM 9 includes 6 IGBTs and free-wheeling diodes (FWD) connected in parallel to the respective IGBTs (both are not numbered). Then, the IPM 9 converts the DC voltage to 3-phase AC voltage by switching each IGBT ON/OFF through using a gate drive signal 18 supplied from the gate drive circuit 13. This 3-phase AC voltage is an output of the inverter device 3. Meanwhile, the DC voltage detection circuit 8 measures the DC voltage input into the inverter device 3 and sends, as a DC voltage detection signal 14, the measured results to the controller 12.

The 3-phase AC voltage output from the inverter device 3 is applied to windings of the motor 4. In addition, a U-phase motor current detection circuit 10 and a V-phase motor current detection circuit 11 are disposed partway through paths of a U-phase current and a V-phase current, respectively, of 3-phase current flowing through the motor 4. These current detection circuits 10 and 11 supply, to the controller 12, a U-phase motor current detection signal 15 and a V-phase motor current detection signal 16, respectively. Based on the DC voltage detection signal 14, the U-phase motor current detection signal 15, and the V-phase motor current detection signal 16, the controller 12 calculates a DUTY ratio so as to switch ON/OFF each IGBT in the IPM 9 and outputs a PWM signal 17 with the DUTY ratio. The PWM signal 17 is converted to a gate drive signal 18 having an enough voltage to switch ON/OFF each IGBT in the gate drive circuit 13.

The controller 12 includes general computer hardware such as a CPU (central processing unit), a RAM (random access memory), and a ROM (read only memory). The ROM stores, for example, a control program executed by the CPU and various data.

Figure 2:
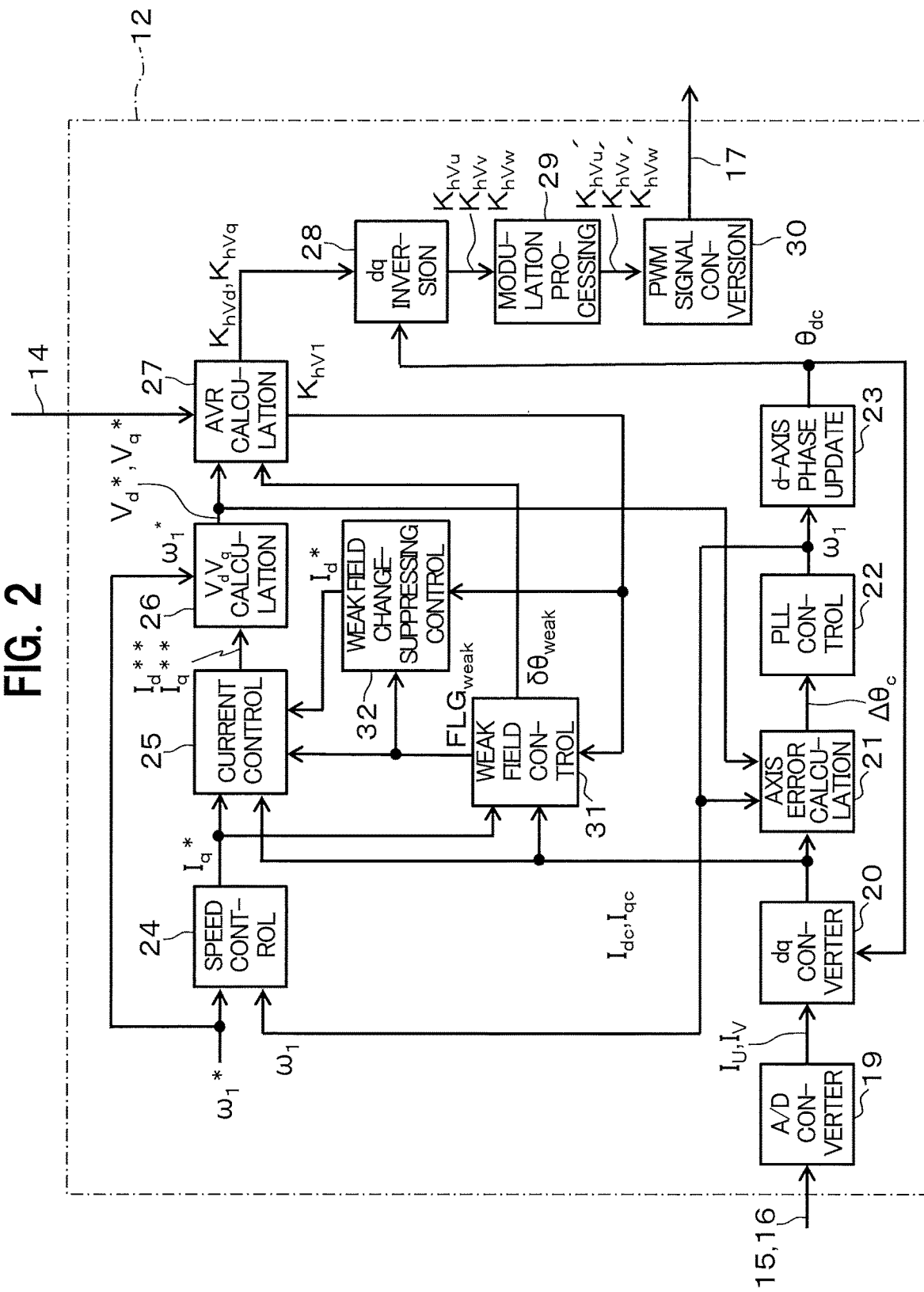
FIG. 2 is a block diagram illustrating a controller according to the first embodiment.

FIG. 2 is a block diagram showing an algorithm of the controller 12 and illustrates functional blocks implemented by, for example, the control program.

In FIG. 2, the U-phase motor current detection signal 15 and the V-phase motor current detection signal 16 are input into an A/D converter 19. Then, the A/D converter 19 outputs, as a U-phase current detection value $I_U$ and a V-phase current detection value $I_V$, the resulting values as obtained by multiplying the U-phase motor current detection signal 15 and the V-phase motor current detection signal 16 by corresponding predetermined gains (referred to as current detection circuit gains).

A dq converter 20 receives the U-phase current detection value $I_U$, the V-phase current detection value $I_V$, and a d-axis phase $\theta_{dc}$ (its details are described below). Then, the dq converter 20 outputs a d-axis current detection value $I_{dc}$ and a q-axis current detection value $I_{qc}$ calculated based on the following [Expression 1].

$$I_w = -I_v - I_u \qquad \text{[Expression 1]}$$

$$\begin{pmatrix} I_\alpha \\ I_\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} I_u \\ I_v \\ I_w \end{pmatrix}$$

$$\begin{pmatrix} I_{dc} \\ I_{qc} \end{pmatrix} = \begin{pmatrix} \cos(\theta_{dc}) & -\sin(\theta_{dc}) \\ \sin(\theta_{dc}) & \cos(\theta_{dc}) \end{pmatrix} \begin{pmatrix} I_\alpha \\ I_\beta \end{pmatrix}.$$

Here, a coordinate system is assumed that rotates at the electrical angle of the motor 4 (value obtained by multiplying a mechanical angle by the number of pole pairs of the motor 4). In this coordinate system, a d-axis is set to the direction of a magnetic flux generated by the permanent magnets, and a q-axis is set to an axis perpendicular to the d-axis. The coordinate system having the d-axis and the q-axis is called a "dq-axis coordinate system". The above-mentioned d-axis current detection value $I_{dc}$ and q-axis current detection value $I_{qc}$ are values of the dq-axis coordinate system.

Meanwhile, an axis error calculator 21 receives the d-axis current detection value $I_{dc}$, the q-axis current detection value $I_{qc}$, and an inverter frequency $\omega_1$. Then, the axis error calculator 21 calculates and outputs an axis error $\Delta\theta c$ based on the following [Expression 2]. Note that in [Expression 2], $V_d^*$ is a d-axis voltage command value; $V_q^*$ is a q-axis voltage command value; R is resistance of the windings of the motor; $L_d$ is motor d-axis inductance; and $L_q$ is motor q-axis inductance.

$$\Delta\theta_c = \tan^{-1}\{(V^*_d - R \times I_{dc} + \omega_1 \times L_q \times I_{qc})/(V^*_q - R \times I_{qc} - \omega_1 \times L_q \times I_{dc})\}. \quad \text{[Expression 2]}$$

A PLL control unit 22 uses the axis error $\Delta\theta c$ as an input and executes proportional integral control to calculate the inverter frequency $\omega_1$. A d-axis phase updating unit 23 adds, to the previous output value (before 1 calculation cycle) of a d-axis phase $\theta_{dc}$, a value $\Delta\theta_{dc}$ obtained by dividing the inverter frequency $\omega_1$ by that at the previous calculation cycle. Then, the d-axis phase updating unit 23 outputs the added value as a current value for the d-axis phase $\theta_{dc}$. A speed control unit 24 (q-axis current command unit) calculates a deviation $\Delta\omega$ (not shown) between an inverter frequency command value $\omega_1^*$ (frequency command value) and the inverter frequency $\omega_1$, and executes proportional integral control based on the deviation $\Delta\omega$ to calculate a q-axis current command value $I_q^*$.

A current control unit 25 calculates a deviation $\Delta I_q$ (not shown) between the q-axis current command value $I_q^*$ and the q-axis current detection value $I_{qc}$, and executes proportional integral control using the deviation $\Delta I_q$ as an input to calculate a q-axis current command correction amount (not shown). In addition, the current control unit 25 outputs, as a second q-axis current command value $I_q^{**}$, a value obtained by adding the q-axis current command correction amount to the q-axis current command value $I_q^*$. Further the current control unit 25 executes proportional integral control using, as an input, a deviation $\Delta I_d$ (not shown) between the d-axis current command value $I_d^*$ and the d-axis current detection value $I_{dc}$, and then outputs the resulting value as a second d-axis current command value $I_d^{**}$.

A $V_d V_q$ calculator 26 receives the inverter frequency command value $\omega_1^*$, the second q-axis current command value $I_q^{}$, and the second d-axis current command value $I_d^{}$, and calculates a d-axis voltage command value $V_d^*$ and a q-axis voltage command value $V_q^*$ by using the following [Expression 3]. Note that in [Expression 3], $K_e$ is an induced voltage constant of the motor 4.

$$\begin{cases} V_d^* = R \times I_d^{**} - \omega_1^* \times L_q \times I_q^{**} \\ V_q^* = R \times I_q^{**} + \omega_1^* \times L_d \times I_d^{**} + \omega_1^* \times K_e \end{cases}. \quad \text{[Expression 3]}$$

An AVR (automatic voltage regulator; voltage correction) calculator 27 receives the d-axis voltage command value $V_d^*$ and the q-axis voltage command value $V_q^*$ and calculates a motor voltage phase $\delta\theta$ based on [Expression 4].

$$\delta\theta = \tan^{-1}\left(-\frac{V_d^*}{V_q^*}\right). \quad \text{[Expression 4]}$$

In addition, the AVR calculator 27 calculates a voltage command wave high point V1 based on [Expression 5].

$$V_1 = V^*_d \times \sin(\delta\theta) + V^*_q \times \cos(\delta\theta). \quad \text{[Expression 5]}$$

Further, the AVR calculator 27 calculates a DC voltage detection value $V_{dc}$, which is obtained by multiplying the DC voltage detection signal 14 by a predetermined gain (referred to as a DC voltage detection circuit gain), and then calculates a motor voltage modulation rate $K_{hV1}$ based on [Expression 6].

$$K_{hV1} = \frac{2 \times V_1}{V_{dc}}. \quad \text{[Expression 6]}$$

Furthermore, the AVR calculator 27 calculates and outputs a d-axis voltage modulation rate $K_{hVd}$ and a q-axis voltage modulation rate $K_{hVq}$ based on [Expression 7]. In [Expression 7], $\delta\theta_{weak}$ is a weak field control voltage-manipulating variable.

$$K_{hVd} = K_{hV1} \times \sin(\delta\theta + \delta\theta_{weak})$$

$$K_{hVq} = K_{hV1} \times \cos(\delta\theta + \delta\theta_{weak}). \quad \text{[Expression 7]}$$

Meanwhile, a dq inverter unit 28 receives the d-axis voltage modulation rate $K_{hVd}$, the q-axis voltage modulation rate $K_{hVq}$, and the d-axis phase $\theta_{dc}$, and outputs a U-phase voltage modulation rate $K_{hVu}$, a V-phase voltage modulation rate $K_{hVv}$, and a W-phase voltage modulation rate $K_{hVw}$ based on [Expression 8].

$$\begin{pmatrix} K_{hV\alpha} \\ K_{hV\beta} \end{pmatrix} = \begin{pmatrix} \sin(\theta_{dc}) & \cos(\theta_{dc}) \\ -\cos(\theta_{dc}) & \sin(\theta_{dc}) \end{pmatrix} \begin{pmatrix} K_{hVd} \\ K_{hVq} \end{pmatrix} \quad \text{[Expression 8]}$$

$$\begin{pmatrix} K_{hVu} \\ K_{hVv} \\ K_{hVw} \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} K_{hV\alpha} \\ K_{hV\beta} \end{pmatrix}.$$

Here, described is the meaning of "weak field control" used in this embodiment and the below-described additional embodiments. As used in this embodiment and the additional embodiments, the "weak field control" refers to the feature of controlling phases of the d-axis and q-axis voltage modulation rates $K_{hVd}$ and $K_{hVq}$ based on [Expression 7] and then generating, in the windings of the motor 4, a magnetic flux that weakens a magnetic flux generated by the permanent magnets. As described below, even if the weak field control voltage-manipulating variable $\delta\theta_{weak}$ is 0, the magnetic flux that weakens the magnetic flux generated by the permanent magnets may be induced by controlling the d-axis current command value $I_d^*$. This operation may be similar to the weak field control, but is not called the "weak field control" in this embodiment and the additional embodiments.

In addition, the modulation processing unit 29 modulates the U-, V-, and W-phase voltage modulation rates $K_{hVu}$, $K_{hVv}$, and $K_{hVw}$ by using a triangular wave-like modulating signal MD, and outputs post-modulation U-, V-, and W-phase voltage modulation rates $K_{hVu}'$, $K_{hVv}'$, and $K_{hVw}'$. Specifically, the post-modulation U-, V-, and W-phase voltage modulation rates $K_{hVu}'$, $K_{hVv}'$, and $K_{hVw}'$ are expressed in [Expression 9].

$$\begin{pmatrix} K_{hVu}' \\ K_{hVv}' \\ K_{hVw}' \end{pmatrix} = \begin{pmatrix} K_{hVu} \\ K_{hVv} \\ K_{hVw} \end{pmatrix} - \begin{pmatrix} \max\{K_{hVu}, K_{hVv}, K_{hVw}\} + \\ \min\{K_{hVu}, K_{hVv}, K_{hVw}\} \end{pmatrix} / 2. \quad \text{[Expression 9]}$$

Figure 3:
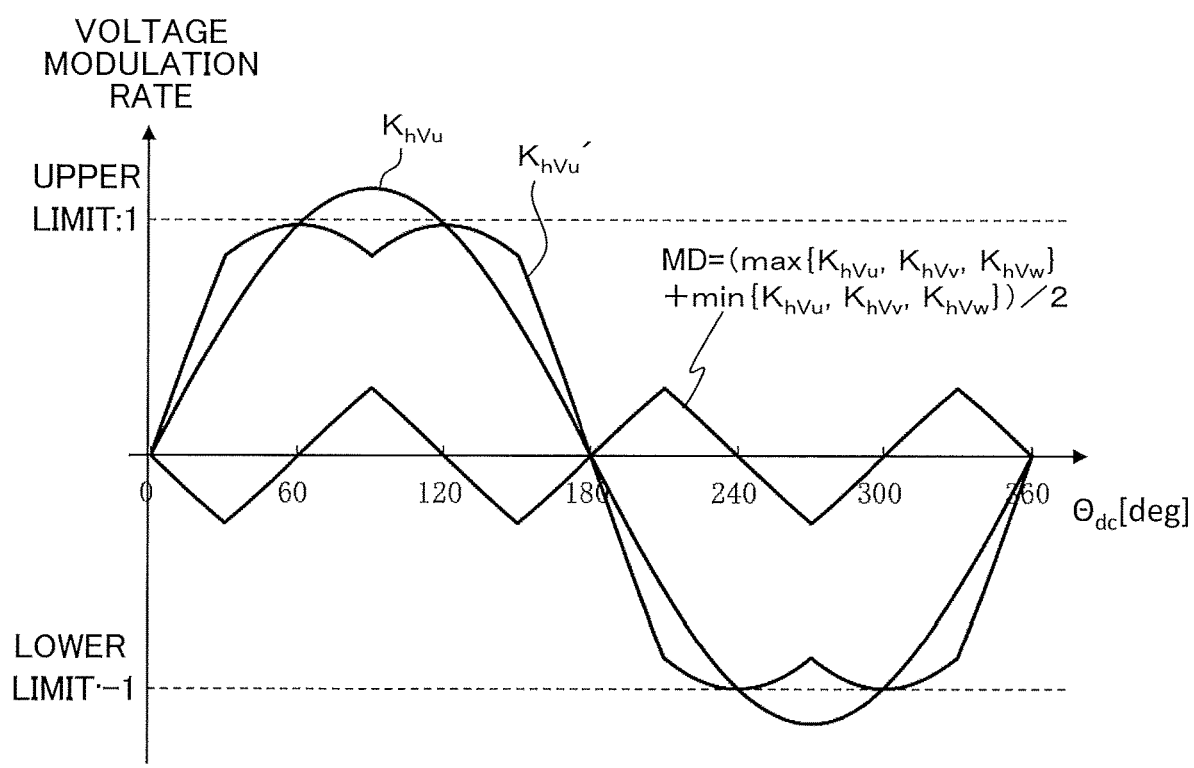
FIG. 3 is a waveform diagram showing a pre-modulation U-phase voltage modulation rate, a triangular-wave modulating signal, and a post-modulation U-phase voltage modulation rate according to the first embodiment.
Figure 4:
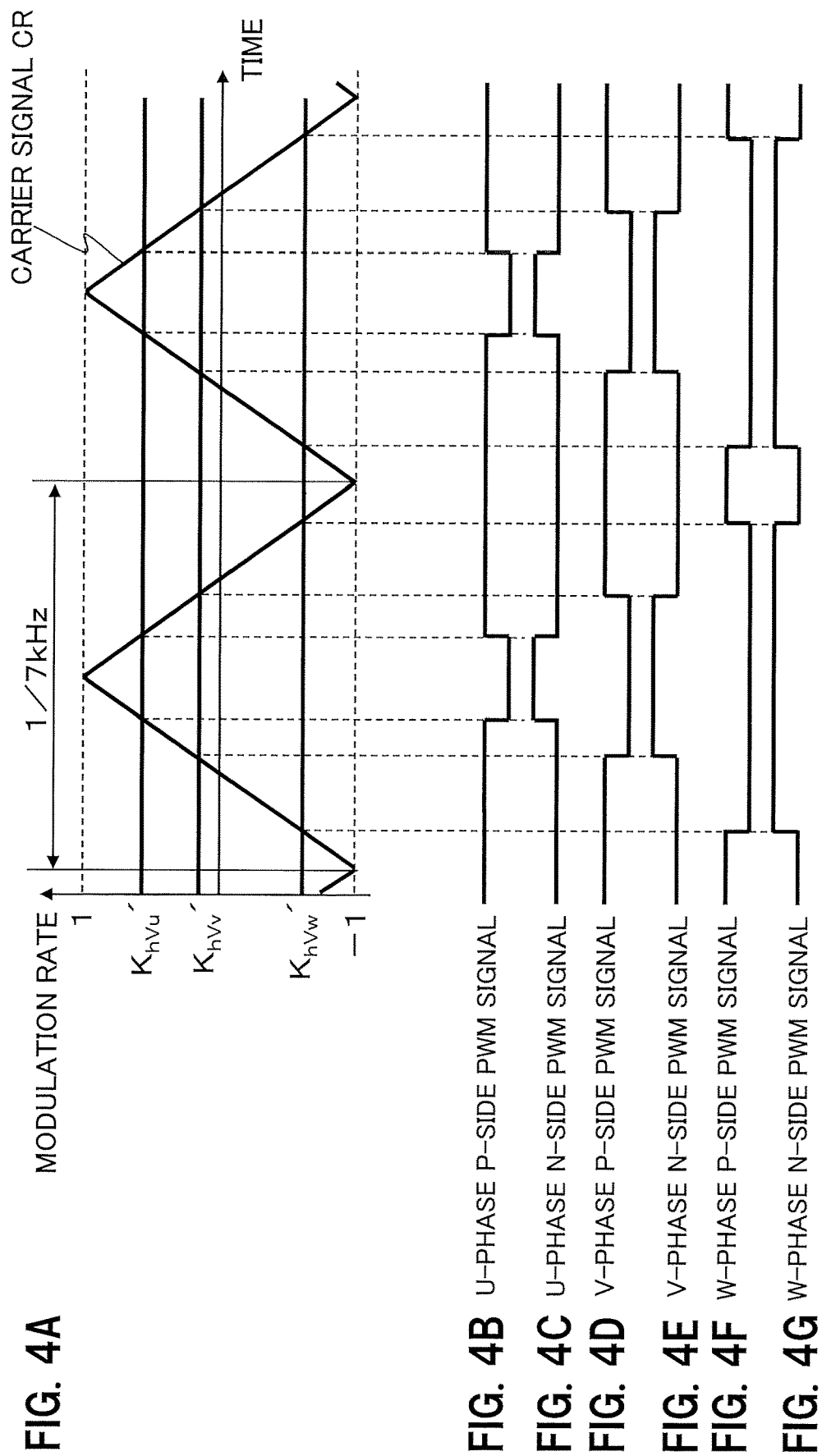
FIGS. 4A to 4G are waveform diagrams illustrating PWM signals and a carrier signal according to the first embodiment.

FIG. 3 is a waveform diagram showing a pre-modulation U-phase voltage modulation rate $K_{hVu}$, a modulating signal MD, and a post-modulation U-phase voltage modulation rate $K_{hVu}'$. Note that a corresponding V-phase signal is delayed 120 degrees from the U-phase signal and a corresponding W-phase signal is delayed 240 degrees from the U-phase signal (not shown).

After the above-mentioned modulation processing is executed in the modulation processing unit 29, the utilization rate of the DC voltage detection value $V_{dc}$ improves. When compared with the case of subjecting the motor 4 to sine wave drive, the output voltage of the inverter device is increased by maximum 15%. In addition, the modulation processing unit 29 executes upper and lower limit processing. Specifically, the upper limit and the lower limit of the output value are restricted to 1 and −1, respectively.

Back to FIG. 2. A PWM signal converter 30 compares how large or small the carrier signal CR is relative to the U-, V-, and W-phase voltage modulation rates $K_{hVu}'$, $K_{hVv}'$, and $K_{hVw}'$, and then outputs a PWM signal 17. Here, the PWM signal 17 includes 6 signals: a U-phase P-side PWM signal, a U-phase N-side PWM signal, a V-phase P-side PWM signal, a V-phase N-side PWM signal, a W-phase P-side PWM signal, and a W-phase N-side PWM signal.

FIGS. 4A to 4G are waveform diagrams illustrating the PWM signals and a carrier signal CR. As shown, the carrier signal CR is a fixed-cycle triangular wave. Meanwhile, the P-side PWM signal and the N-side PWM signal of each phase are signals where the ON/OFF state is inverted.

When the output values of the modulation processing unit 29, namely the U-, V-, and W-phase voltage modulation rates $K_{hVu}'$, $K_{hVv}'$, and $K_{hVw}'$, reach the upper limit (1) or the lower limit (−1), the output voltage of the inverter device 3 may be saturated, causing the motor to malfunction. This may stop the motor 4. In order to prevent the motor 4 from stopping in this way, the weak field control unit 31 in FIG. 2 executes, when the motor voltage modulation rate $K_{hV1}$ reaches 1.15, the weak field control. Specifically, the weak field control unit 31 calculates a deviation $\Delta I_q$ between the q-axis current command value $I_q^*$ and the q-axis current detection value $I_{qc}$, performs integral control using the deviation $\Delta I_q$ as an input, and calculates a weak field control voltage-manipulating variable $\delta\theta_{weak}$.

Further, when the motor voltage modulation rate $K_{hV1}$ reaches 1.15, the weak field control unit 31 switches a weak field control flag $FLG_{weak}$ from OFF to ON. The flag $FLG_{weak}$ is a flag that designates the ON/OFF state of the weak field control. When the weak field control flag $FLG_{weak}$ is ON, the current control unit 25 terminates the proportional integral control using the deviation $\Delta I_q$ (=$I_q^*-I_{qc}$) and the deviation $\Delta I_d$ (=$I_d^*-I_{dc}$). At this time, the integral term of the proportional integral control is not reset and the value before the termination of the proportional integral control is held.

Meanwhile, when the flag $FLG_{weak}$ is ON, the weak field control unit 31, instead of the current control unit 25, is used to correct the deviation $\Delta I_q$ between the q-axis current command value $I_q^*$ and the q-axis current detection value $I_{qc}$ by using feedback control. Note that the condition where the motor voltage modulation rate $K_{hV1}$ reaches 1.15 means that the output voltage of the inverter device 3 gets saturated. This is the same as the condition where the output value (e.g., the U-phase voltage modulation rate $K_{hVu}'$ shown in FIG. 3) of the modulation processing unit 29 reaches the upper limit (1) or the lower limit (−1). The above-described $K_{hV1}$=1.15 is the upper limit when the motor 4 is subject to sine wave drive (when a sine wave-like current flows through the motor 4). If the motor 4 is not subject to sine wave drive, the upper limit may be further elevated.

Figure 5:
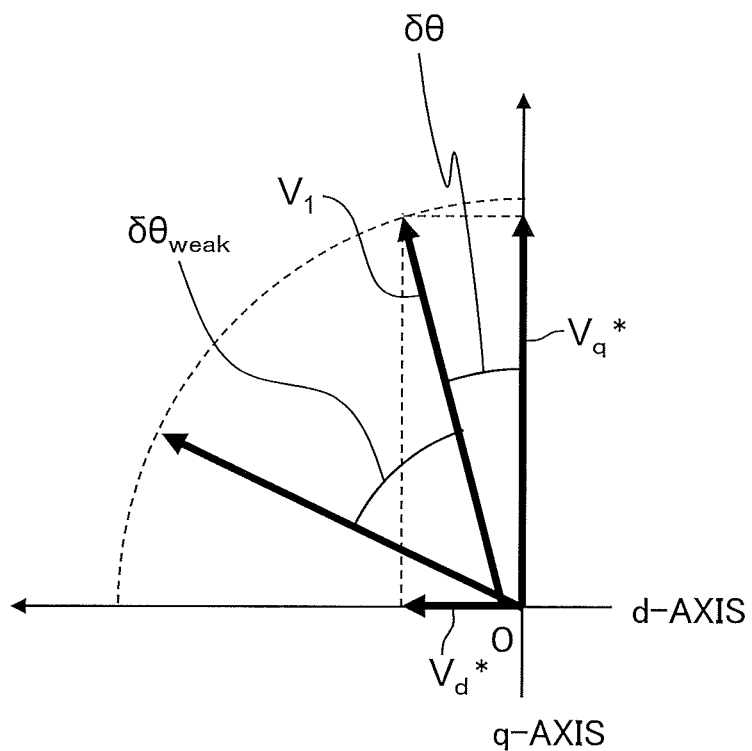
FIG. 5 is a diagram showing a phase relation among d-axis and q-axis voltage command values at the time of weak field control and a voltage command wave high point according to the first embodiment.

FIG. 5 is a diagram showing a phase relation, in the dq-axis coordinate system, among a d-axis voltage command value $V_d^*$ and a q-axis voltage command value $V_q^*$ at the time of weak field control and a voltage command wave high point $V_1$. As shown in [Expression 5], $V_1$ is a synthetic vector of the $V_d^*$ and $V_q^*$. Provided that in the weak field area, the phase of voltage applied to the motor 4 is a phase obtained by adding $\delta\theta_{weak}$ to the phase of $V_1$, namely the motor voltage phase $\delta\theta$. In addition, when the $FLG_{weak}$ is ON and the $K_{hV1}$ is lowered to 1.10, the weak field control unit 31 switches the $FLG_{weak}$ to OFF. At this time, the integral term of the proportional integral control of the weak field control unit 31 is cleared to 0. When the $FLG_{weak}$ is switched OFF, the current control unit 25 resumes operation of the proportional integral control.

In this way, depending on the ON/OFF state of the flag $FLG_{weak}$, the proportional integral control using the deviations $\Delta I_d$ and $\Delta I_q$ in the current control unit 25 is switched between stop and execution states. Because of this, if the ON/OFF state of the flag $FLG_{weak}$ is frequently switched, the current control unit 25 is unstably operated. Here, in this embodiment, the flag $FLG_{weak}$ is switched less frequently so as to stably operate the controller 12.

Next, described is how to operate the weak field change-suppressing control unit 32 (d-axis current command unit) shown in FIG. 2. For instance, when AC voltage supplied from the AC voltage source 1 has distortion and/or when the electrostatic capacity of the smoothing capacitor 7 is small, the DC voltage output from the converter circuit 2 may have convoluted ripple components. The ripple components are transferred, via the DC voltage detection signal 14, to $K_{hV1}$. As described above, when the $K_{hV1}$ reaches 1.15, the weak field control unit 31 switches the $FLG_{weak}$ from OFF to ON; and when the $K_{hV1}$ decreases to 1.10, the weak field control unit 31 switches the $FLG_{weak}$ from ON to OFF. Due to this, the $FLG_{weak}$ is switched frequently when the ripple components of the $K_{hV1}$ are 0.05 or more.

To suppress this unstable operation, the weak field change-suppressing control unit 32 adjusts the d-axis current command value $I_d^*$ so as to prevent the $K_{hV1}$ from fluctuating in a range from less than 1.10 to more than 1.15.

Figure 6:
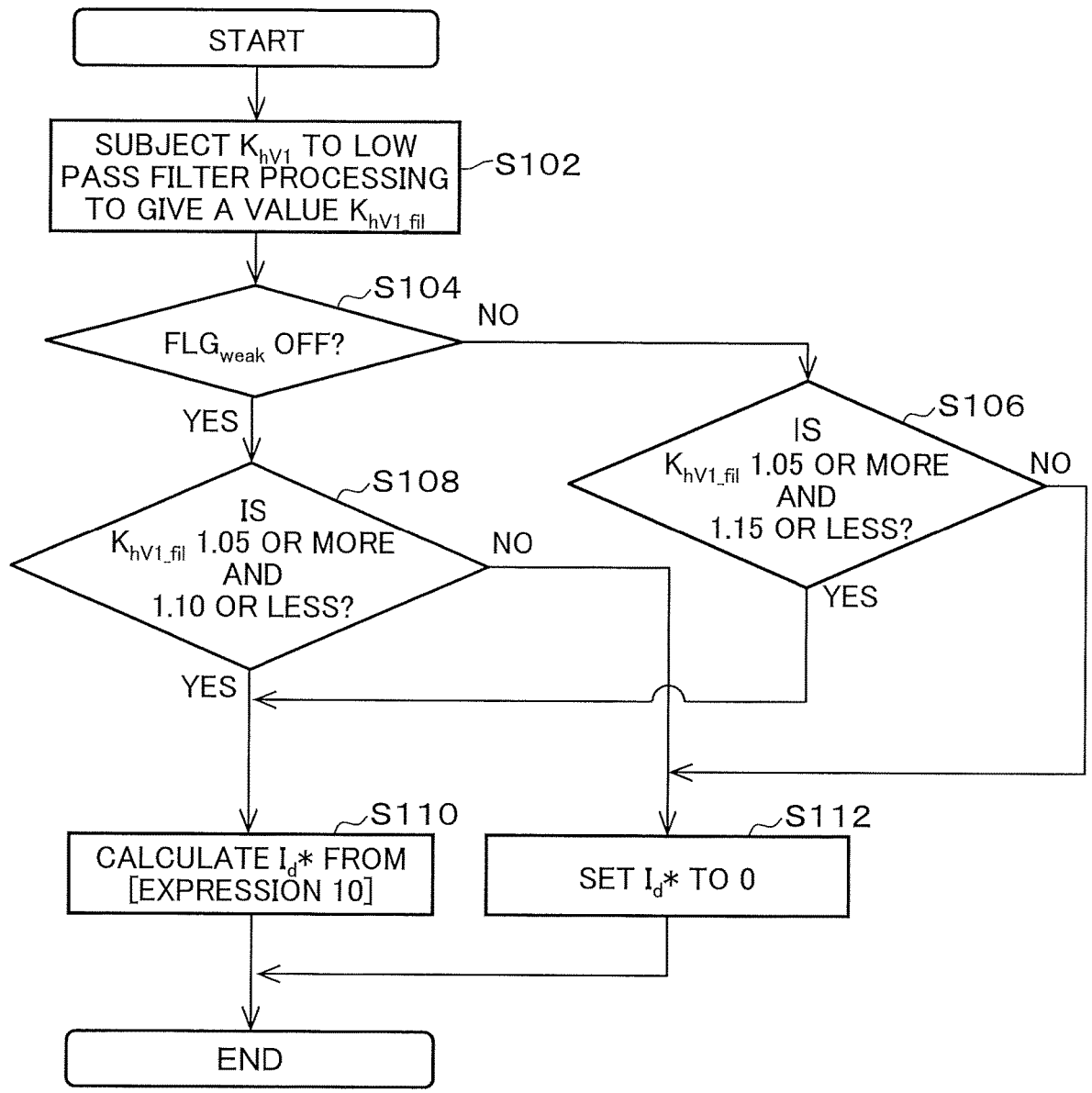
FIG. 6 is a flow chart of a control program executed in a weak field change-suppressing control unit according to the first embodiment.

FIG. 6 is a flow chart of a control program executed every given time in the weak field change-suppressing control unit 32.

When the process goes to Step S102 of FIG. 6, the low range component $K_{hV1\_fil}$ of the motor voltage modulation rate, which component is obtained after the $K_{hV1}$ is subjected to low-pass filter processing, is calculated.

Next, when the process goes to Step S104, it is determined whether or not the weak field control flag $FLG_{weak}$ is OFF. If the flag $FLG_{weak}$ is OFF, this step is judged as "YES". Then, the process goes to Step S108. At Step S108, it is determined whether or not the low range component $K_{hV1\_fil}$ of the motor voltage modulation rate is 1.05 or more and 1.10 or less. If this step is judged as "YES", the process goes to Step S110. At Step S110, the d-axis current command value $I_d^*$ is calculated based on [Expression 10]. Provided that K of [Expression 10] is a proportional gain.

$$I^*_d = (1.05 - K_{hV1\_fil}) \times K. \qquad \text{[Expression 10]}$$

Meanwhile, if the $FLG_{weak}$ is OFF ("YES" at Step S104) and the $K_{hV1\_fil}$ is less than 1.05 or more than 1.10, the process goes to Step S112. Here, the $I_d^*$ is set to 0.

Figure 7:
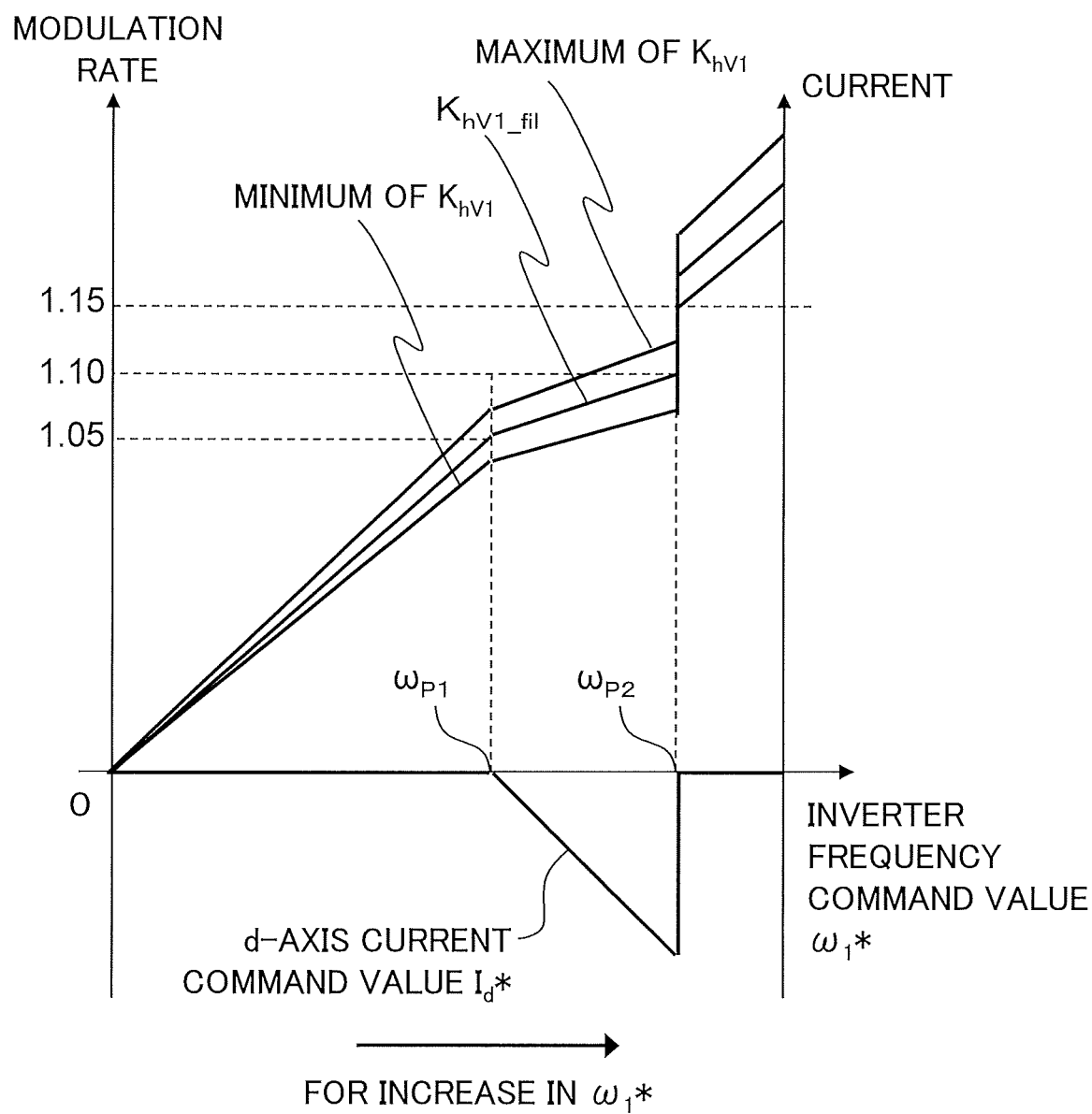
FIG. 7 is a graph showing the relationship among a d-axis current command value, an inverter frequency command value, and a motor voltage modulation rate according to the first embodiment.

FIG. 7 is a graph showing the relationship among the d-axis current command value $I_d^*$, the inverter frequency command value $\omega_1^*$, and the motor voltage modulation rate $K_{hV1}$.

Specifically, in FIG. 7, the q-axis current command value $I_q^*$ is kept constant; the abscissa represents the inverter frequency command value $\omega_1^*$, which is increased; and the ordinate represents the d-axis current command value $I_d^*$, the maximum/minimum of the motor voltage modulation rate $K_{hV1}$, and the low range component $K_{hV1\_fil}$ of the motor voltage modulation rate. As the inverter frequency command value $\omega_1^*$ increases, the low range component $K_{hV1\_fil}$ of the motor voltage modulation rate becomes larger. When the $K_{hV1\_fil}$ is less than 1.05, Step S112 of FIG. 6 is executed and the d-axis current command value $I_d^*$ is set to 0.

As soon as the inverter frequency command value $\omega_1^*$ reaches the frequency $\omega_{P1}$, the $K_{hV1\_fil}$ is 1.05 or more. Then, Step S110 of FIG. 6 is executed, so that the $I_d^*$ starts decreasing (the absolute value starts increasing). While the absolute value of the $I_d^*$ is increased, the slope of the $K_{hV1\_fil}$ gets less steep. As soon as the inverter frequency command value $\omega_1^*$ reaches the frequency $\omega_{P2}$, the $K_{hV1\_fil}$ is 1.10 or more. Then, Step S112 of FIG. 6 is re-executed. At this step, the $I_d^*$ is set to 0, so that the $K_{hV1\_fil}$ abruptly rises as shown in FIG. 7.

In this way, after the $K_{hV1\_fil}$ abruptly rises, the maximum of the $K_{hV1}$ is 1.15 or more and the minimum of the $K_{hV1}$ is 1.10 or more as shown in FIG. 7 where $\omega_1^* > \omega_{P2}$. As described above, when the $K_{hV1}$ reaches 1.15, the weak field control unit 31 switches the $FLG_{weak}$ from OFF to ON; and when the $K_{hV1}$ decreases to 1.10, the weak field control unit 31 switches the $FLG_{weak}$ from ON to OFF. Hence, in FIG. 7 where $\omega_1^* > \omega_{P2}$, the $FLG_{weak}$ is switched less frequently.

If the weak field control flag $FLG_{weak}$ is switched ON, Step S104 is judged as "NO" when the control program (FIG. 6) is next implemented. Then, the process goes to Step S106. Here, whether or not the low range component $K_{hV1\_fil}$ of the motor voltage modulation rate is 1.05 or more and 1.15 or less is determined. In FIG. 7 where the $\omega_1^*$ is frequency $\omega_{P2}$ or more, the $K_{hV1\_fil}$ exceeds 1.15, so that this step is judged as "NO". Then, the process goes to Step S112. Due to this, the d-axis current command value $I_d^*$ is kept constant at 0.

If the $\omega_1^*$ decreases from this state (the flag $FLG_{weak}$ is ON) and the low range component $K_{hV1\_fil}$ modulation of the motor voltage rate is 1.05 or more and 1.15 or less, Step S106 is judged as "YES". Here, at Step S110, the d-axis current command value $I_d^*$ is calculated based on [Expression 10]. Meanwhile, if the $FLG_{weak}$ is ON and the $K_{hV1\_fil}$ is less than 1.05, the $I_d^*$ is set to 0 at Step S112.

Figure 8:
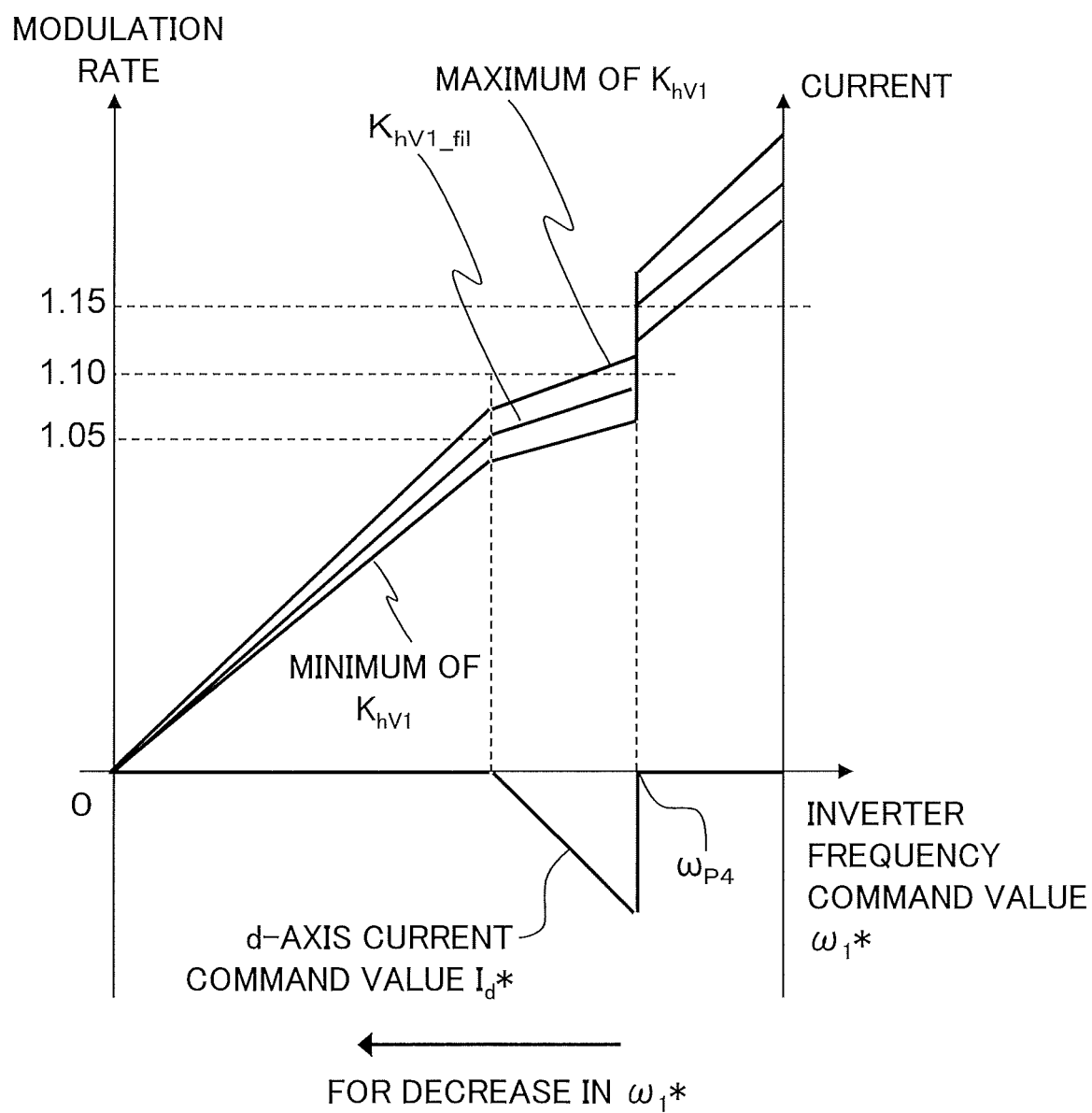
FIG. 8 is a graph showing another relationship among the d-axis current command value, the inverter frequency command value, and the motor voltage modulation rate according to the first embodiment.

FIG. 8 is a graph showing another relationship among the d-axis current command value $I_d^*$, the inverter frequency command value $\omega_1^*$, and the motor voltage modulation rate $K_{hV1}$.

Specifically, in FIG. 8, the q-axis current command value $I_q^*$ is kept constant; the abscissa represents the inverter frequency command value $\omega_1^*$, which is decreased; and the ordinate represents the d-axis current command value $I_d^*$, the maximum/minimum of the motor voltage modulation rate $K_{hV1}$, and the low range component $K_{hV1\_fil}$ of the motor voltage modulation rate.

As the $\omega_1^*$ decreases, the $K_{hV1\_fil}$ also decreases. When the $K_{hV1\_fil}$ becomes 1.15 or less at the frequency $\omega_{P4}$, the $I_d^*$ decreases stepwise (the absolute value increases) and the $K_{hV1}$ also decreases stepwise. This allows the maximum of the $K_{hV1}$ to be less than 1.15 and the minimum of the $K_{hV1}$ to be less than 1.10, so that the $FLG_{weak}$ is switched less frequently.

As described above, this embodiment includes: an inverter (9) which converts supplied DC voltage ($V_{dc}$) to an AC output voltage and supplies the AC output voltage to windings, and which, in accordance with the DC voltage ($V_{dc}$), changes a saturation level at which the output voltage is saturated, in order to drive a motor (4) equipped with a stator having the windings and a rotor having permanent magnets; and a controller (12) which, when the output voltage is lower than the saturation level, increases an output current of the inverter such that a magnetic flux that weakens or strengthens a magnetic flux generated by the permanent magnets is generated in the windings.

In addition, the controller (12) includes, when in a coordinate system that rotates at a rotation speed of the electrical angle of the motor (4), a d-axis is set to the direction of a magnetic flux generated by the permanent magnets and a q-axis is set to an axis perpendicular to the d-axis, the q-axis current command unit (24) configured to output the q-axis current command value ($I_q^*$), which is a command value for the q-axis component of the output voltage, based on the frequency command value ($\omega_1^*$); and the d-axis current command unit (32) configured to output the d-axis current command value ($I_d^*$), which is a command value for the d-axis component of the output current, based on the frequency command value ($\omega_1^*$), wherein the d-axis current command unit (32) controls, when the output voltage is lower than the saturation level, the d-axis current command value ($I_d^*$) such that a magnetic flux that weakens a magnetic flux generated by the permanent magnets is generated in the windings.

That is, based on the low range component $K_{hV1\_fil}$ of the motor voltage modulation rate, Steps S110 and S112 set the d-axis current command value $I_d^*$. This can prevent the flag $FLG_{weak}$ from being switched frequently, allowing for stable operation of the motor 4.

Second Embodiment

The following describes, in detail, a motor drive system according to the second embodiment of the present invention. Note that in the description below, elements corresponding to the respective elements of FIGS. 1 to 8 have the same reference numerals so as to avoid redundancy.

The weak field change-suppressing control unit 32 according to the above first embodiment executes the proportional control in [Expression 10]. The proportional gain K of this proportional control is preferably adjusted in accordance with characteristics of the motor 4. Specifically, when the proportional gain K is too large, the d-axis current is too small (the absolute value is too large), causing a problem of increasing a loss in the motor 4 or the inverter device 3. By contrast, when the proportional gain K is too small, a problem occurs where the weak field control flag $FLG_{weak}$ is switched frequently. Here, this embodiment is to mitigate complexities of changing the proportional gain K in accordance with the characteristics of the motor 4.

The configuration of this embodiment is the same as of the first embodiment (FIGS. 1 and 2). However, as a control program executed in the weak field change-suppressing control unit 32, used is one illustrated in FIG. 9 instead of the program according to the first embodiment (FIG. 6).

Figure 9:
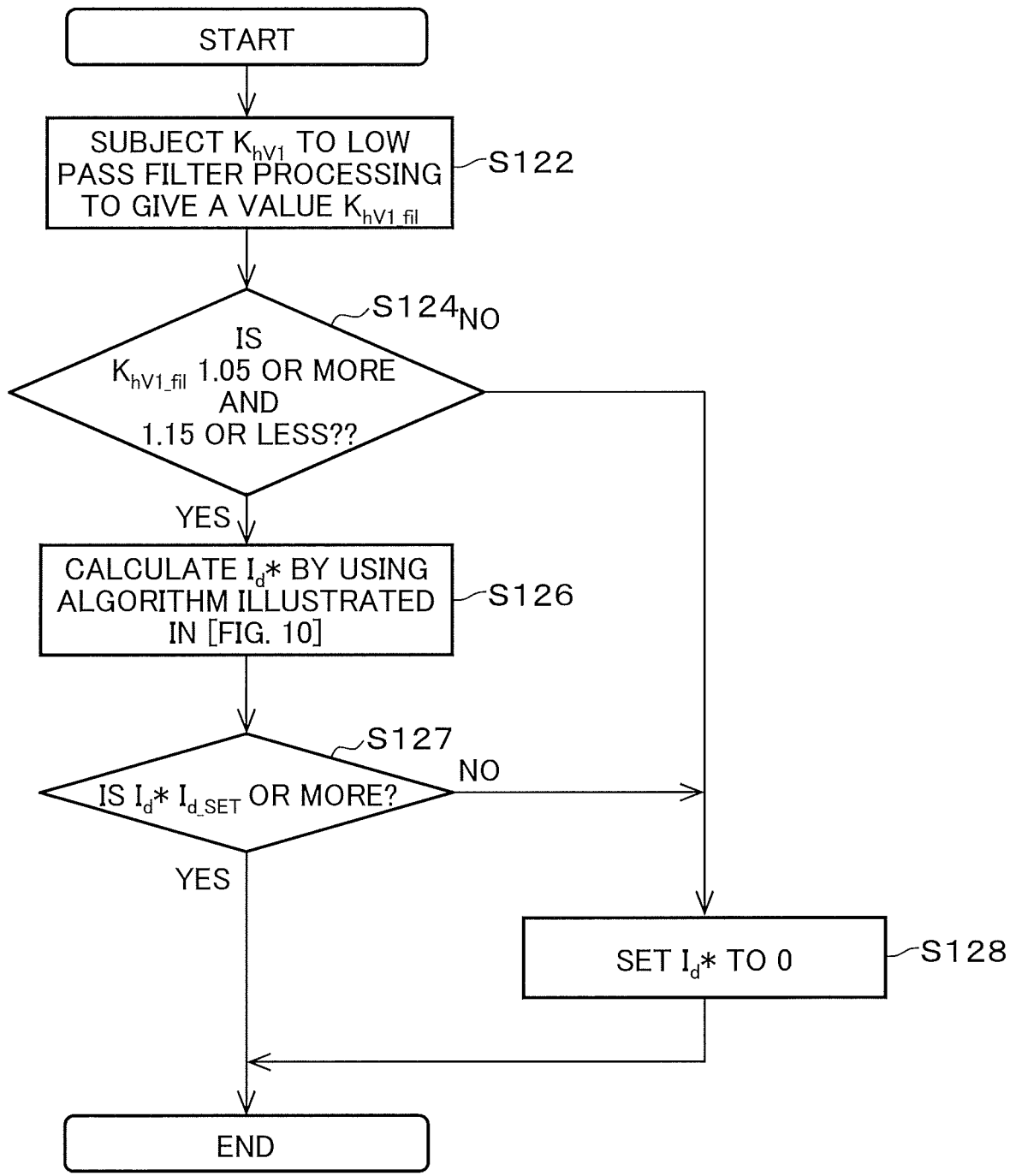
FIG. 9 is a flow chart of a control program executed in a weak field change-suppressing control unit according to a second embodiment.

When the process goes to Step S122 of FIG. 9, the low range component $K_{hV1\_fil}$ of the motor voltage modulation rate, which component is obtained after the motor voltage modulation rate $K_{hV1}$ is subjected to low-pass filter processing, is calculated. Next, when the process goes to Step S124, whether or not the $K_{hV1\_fil}$ is 1.05 or more and 1.15 or less is determined. If this step is judged as "YES", the process goes to Step S126 and the d-axis current command value $I_d^*$ is then calculated.

Figure 10:
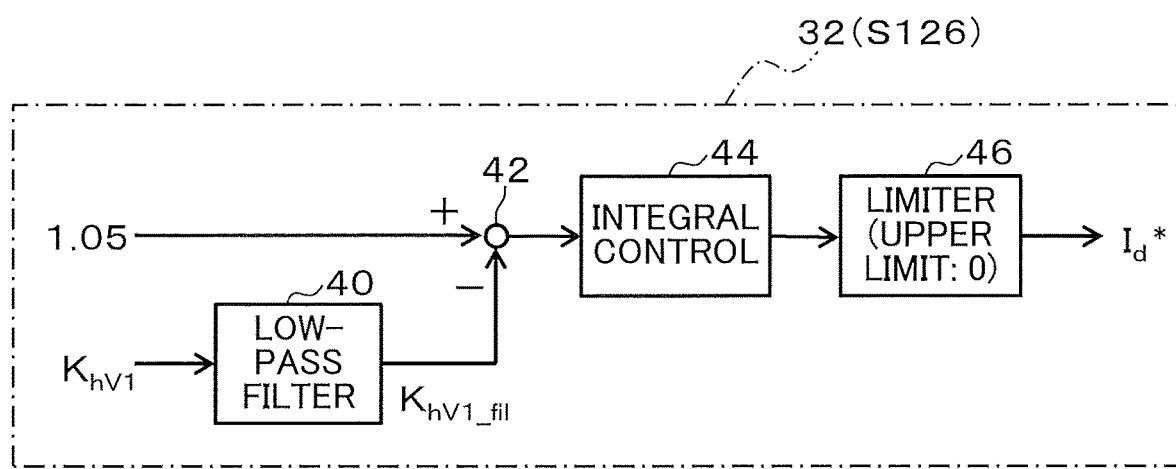
FIG. 10 is a block diagram illustrating a main section of the weak field change-suppressing control unit according to the second embodiment.

FIG. 10 is a block diagram illustrating a main section of the weak field change-suppressing control unit 32 according to this embodiment. That is, FIG. 10 depicts, as blocks, content of the d-axis current command value $I_d^*$ calculation processing executed in the above Step S126.

In FIG. 10, a low-pass filter (LPF) 40 is used to subject the motor voltage modulation rate $K_{hV1}$ to low-pass filter processing so as to output the low range component $K_{hV1\_fil}$ of the motor voltage modulation rate. The subtracter 42 subtracts the low range component $K_{hV1\_fil}$ of the motor voltage modulation rate from a target value 1.05. An integral control unit 44 executes proportional integral control using a value after this subtraction. A limiter processing unit 46 executes limiter processing such that the upper limit of the output signal from the integral control unit 44 is set to 0. Then, the resulting value is output as the d-axis current command value $I_d^*$.

Back to FIG. 9. When the process goes to Step S127, it is determined whether or not the d-axis current command value $I_d^*$ is a predetermined value $I_{d\_SET}$ or more. If this step is judged as "YES", the process of this routine is ended. Here, based on the d-axis current command value $I_d^*$ calculated in Step S126, a d-axis current is controlled. In addition, if either Step S124 or S127 is judged as "NO", the process goes to Step S128 and the d-axis current command value $I_d^*$ is set to 0. Then, the process of this routine is ended.

According to the processing of FIG. 10, the integral control unit 44 controls the d-axis current command value $I_d^*$ so as to make the low range component $K_{hV1\_fil}$ of the motor voltage modulation rate closer to the target value 1.05. This enables the low range component $K_{hV1\_fil}$ of the motor voltage modulation rate to be kept almost constant (at a value at or near the target value 1.05) regardless of the characteristics of the motor 4.

Figure 11:
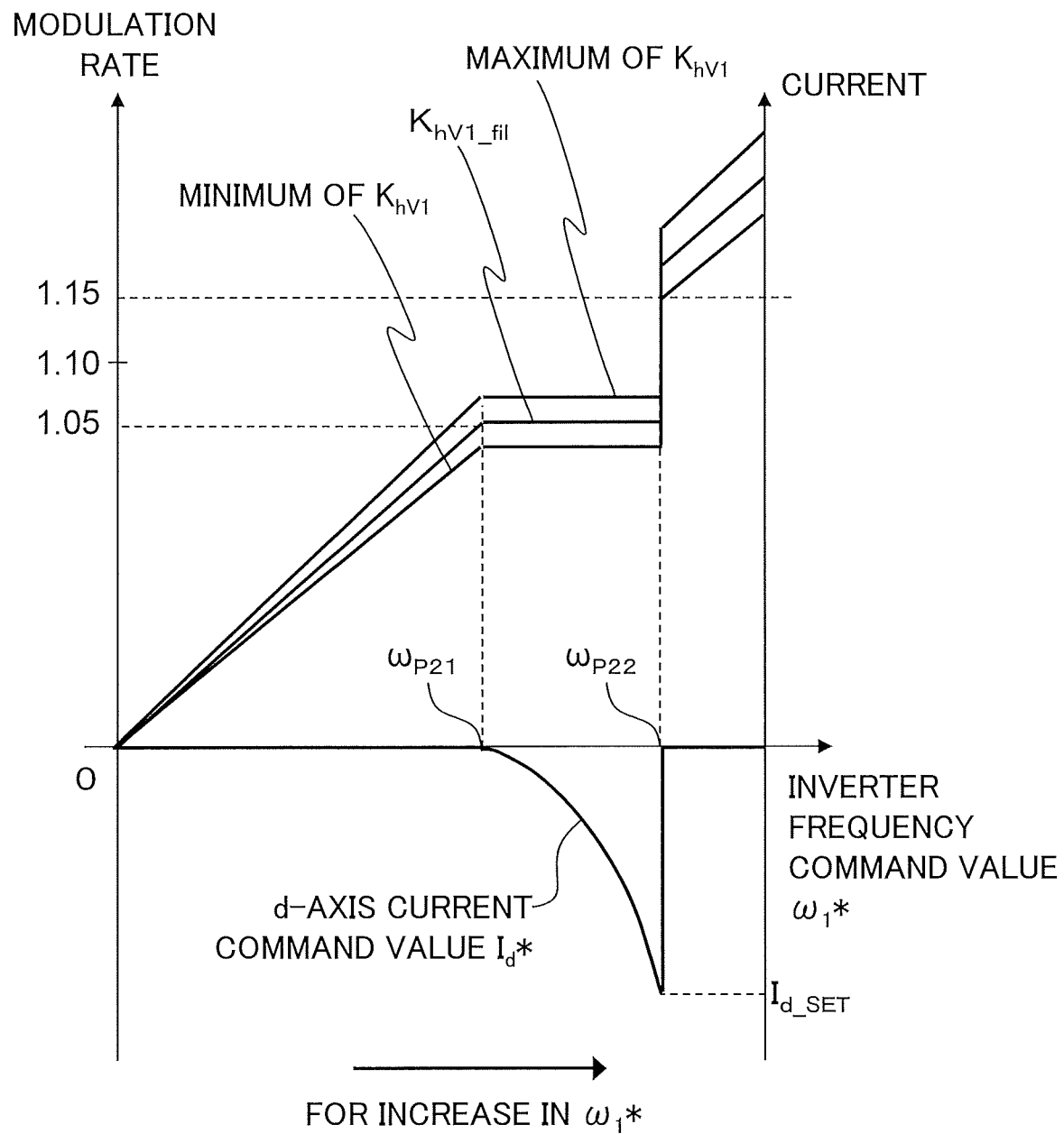
FIG. 11 is a graph showing the relationship among a d-axis current command value, an inverter frequency command value, and a motor voltage modulation rate according to the second embodiment.

FIG. 11 is a graph showing the relationship among the d-axis current command value $I_d^*$, the inverter frequency command value $\omega_1^*$, and the motor voltage modulation rate $K_{hV1}$ according to this embodiment.

Specifically, in FIG. 11 like the above FIG. 7, the q-axis current command value $I_q^*$ is kept constant; and while the inverter frequency command value $\omega_1^*$ is increased, indicated are the d-axis current command value $I_d^*$, the maximum/minimum of the motor voltage modulation rate $K_{hV1}$, and the low range component $K_{hV1\_fil}$ of the motor voltage modulation rate.

In FIG. 11, as the inverter frequency command value $\omega_1^*$ increases, the low range component $K_{hV1\_fil}$ of the motor voltage modulation rate becomes larger. When the $K_{hV1\_fil}$ is less than 1.05, the above Step S128 (see FIG. 9) is executed and the d-axis current command value $I_d^*$ is set to 0.

Once the low range component $K_{hV1\_fil}$ of the motor voltage modulation rate is 1.05, Step S124 (see FIG. 9) is then judged as "YES". Subsequently, Step S126 is executed, so that even if the inverter frequency command value $\omega_1^*$ is then increased, the $K_{hV1\_fil}$ stays at almost 1.05. The frequency $\omega_{P21}$ is set to the inverter frequency command value $\omega_1^*$ where the low range component $K_{hV1\_fil}$ of the motor voltage modulation rate reaches 1.05.

While the low range component $K_{hV1\_fil}$ of the motor voltage modulation rate is kept at the target value 1.05, the $I_d^*$ decreases (the absolute value increases) as the $\omega_1^*$ increases. Because the absolute value of the $I_d^*$ is increased, the $K_{hV1\_fil}$ is kept constant. The condition where the low range component $K_{hV1\_fil}$ of the motor voltage modulation rate is kept constant is the same as the condition where the output voltage of the inverter device 3 is kept substantially constant. When the $I_d^*$ becomes less than the predetermined value $I_{d\_SET}$, Step S128 of FIG. 9 is re-executed and the d-axis current command value $I_d^*$ is thus set to 0. Due to this, the $K_{hV1\_fil}$ abruptly rises. The frequency $\omega_{P22}$ is set to the inverter frequency command value $\omega_1^*$ at the timing of the abrupt rise.

In this way, after the $K_{hV1\_fil}$ abruptly rises, the maximum of the motor voltage modulation rate $K_{hV1}$ exceeds 1.15 and the minimum exceeds 1.10 as shown in FIG. 11 where $\omega_1^* > \omega_{P22}$. As described above, when the $K_{hV1}$ reaches 1.15, the weak field control unit 31 switches the $FLG_{weak}$ from OFF to ON; and when the $K_{hV1}$ decreases to 1.10, the weak field control unit 31 switches the $FLG_{weak}$ from ON to OFF. Hence, in FIG. 11 where $\omega_1^* > \omega_{P22}$, the weak field control flag $FLG_{weak}$ is kept ON, so that the $FLG_{weak}$ is switched less frequently. Here, the predetermined value $I_{d\_SET}$ is a value at which various defects may occur after the $I_d^*$ is decreased to that value or less, and should be adjusted in accordance with the characteristics of the motor 4.

Figure 12:
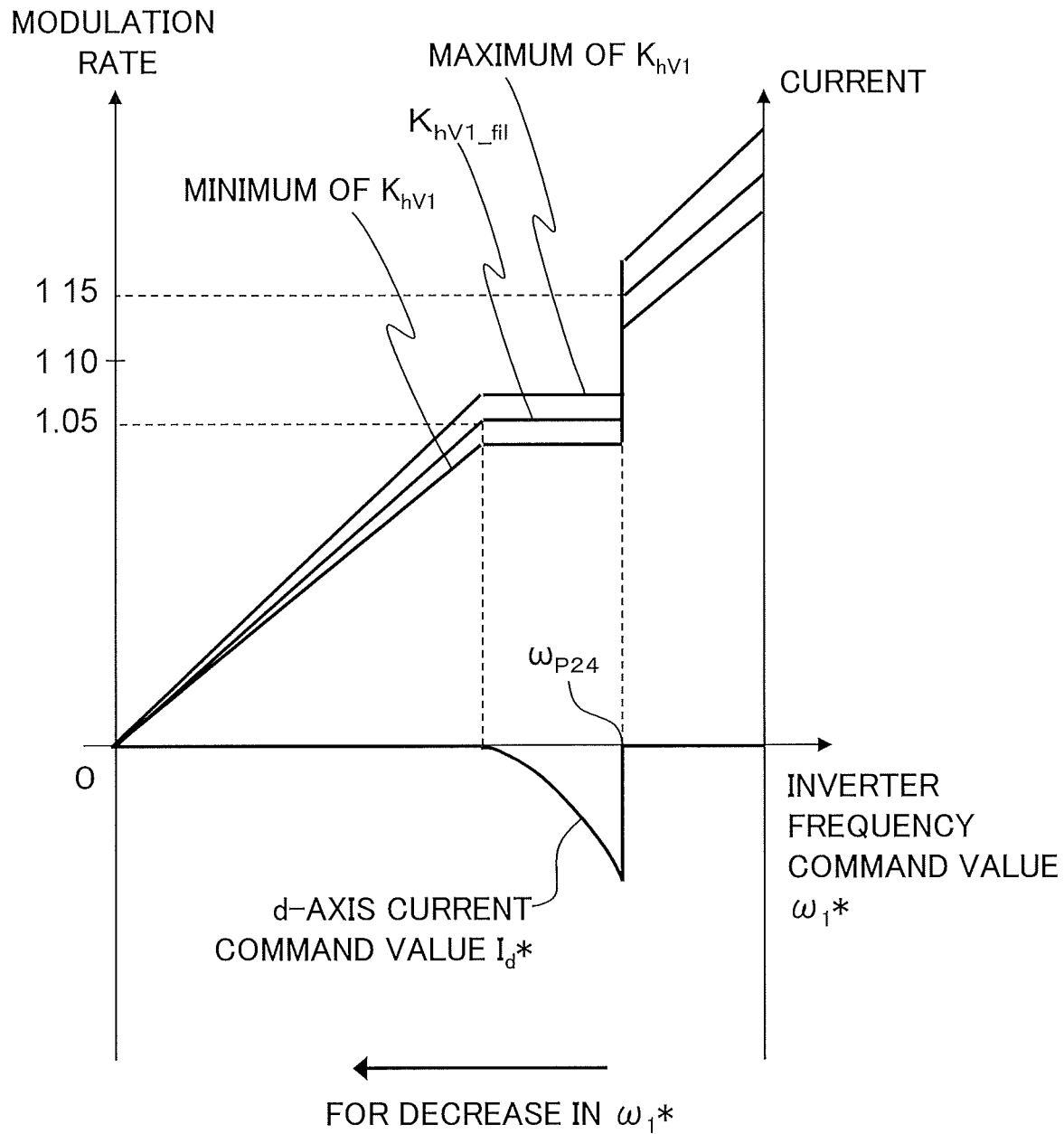
FIG. 12 is a graph showing another relationship among the d-axis current command value, the inverter frequency command value, and the motor voltage modulation rate according to the second embodiment.

FIG. 12 is a graph showing another relationship among the d-axis current command value $I_d^*$, the inverter frequency command value $\omega_1^*$, and the motor voltage modulation rate $K_{hV1}$ according to this embodiment.

Specifically, in FIG. 12, the q-axis current command value $I_q^*$ is kept constant; and while the inverter frequency command value $\omega_1^*$ is decreased, indicated are the d-axis current command value $I_d^*$, the maximum/minimum of the motor voltage modulation rate $K_{hV1}$, and the low range component $K_{hV1\_fil}$ of the motor voltage modulation rate.

As the $\omega_1^*$ decreases from the depicted maximum, the $K_{hV1\_fil}$ also decreases. When the $K_{hV1}$ becomes 1.15 or less at the frequency $\omega_{P24}$, the $I_d^*$ decreases stepwise (the absolute value increases) and the $K_{hV1\_fil}$ also decreases stepwise to the target value 1.05. In the region where the frequency is less than $\omega_{P24}$, the maximum of the motor voltage modulation rate $K_{hV1}$ is less than 1.15 and the minimum is less than 1.10. This permits the flag $FLG_{weak}$ to be switched OFF by the weak field control unit 31. This OFF state stays continuously. Because of the above, The $FLG_{weak}$ is switched less frequently.

As described above, according to this embodiment, the d-axis current command unit (32) controls the d-axis current command value ($I_d^*$) such that the output voltage is kept substantially constant while the frequency command value ($\omega_1^*$) changes. More specifically, based on the low range component $K_{hV1\_fil}$ of the motor voltage modulation rate, the d-axis current command value $I_d^*$ is set in Steps S126 and S128. This, like the first embodiment, can prevent the flag $FLG_{weak}$ from being switched frequently. Besides, the d-axis current command value $I_d^*$ can be set without using [Expression 10] (without using the proportional gain K). Hence, it is possible to mitigate complexities of setting the proportional gain K in accordance with the characteristics of the motor 4.

Third Embodiment

The following describes, in detail, a motor drive system according to the third embodiment of the present invention.

In the weak field change-suppressing control unit 32 according to the above second embodiment, the predetermined value $I_{d\_SET}$ has been adjusted in accordance with the characteristics of the motor 4. In this embodiment, this adjustment is unnecessary, and it is possible to mitigate complexities of changing various parameters in accordance with the characteristics of the motor 4.

The configuration of this embodiment is similar to that of the first embodiment (FIGS. 1 and 2), but the algorithm of the controller 12 differs from that of the first embodiment (FIG. 2).

Figure 13:
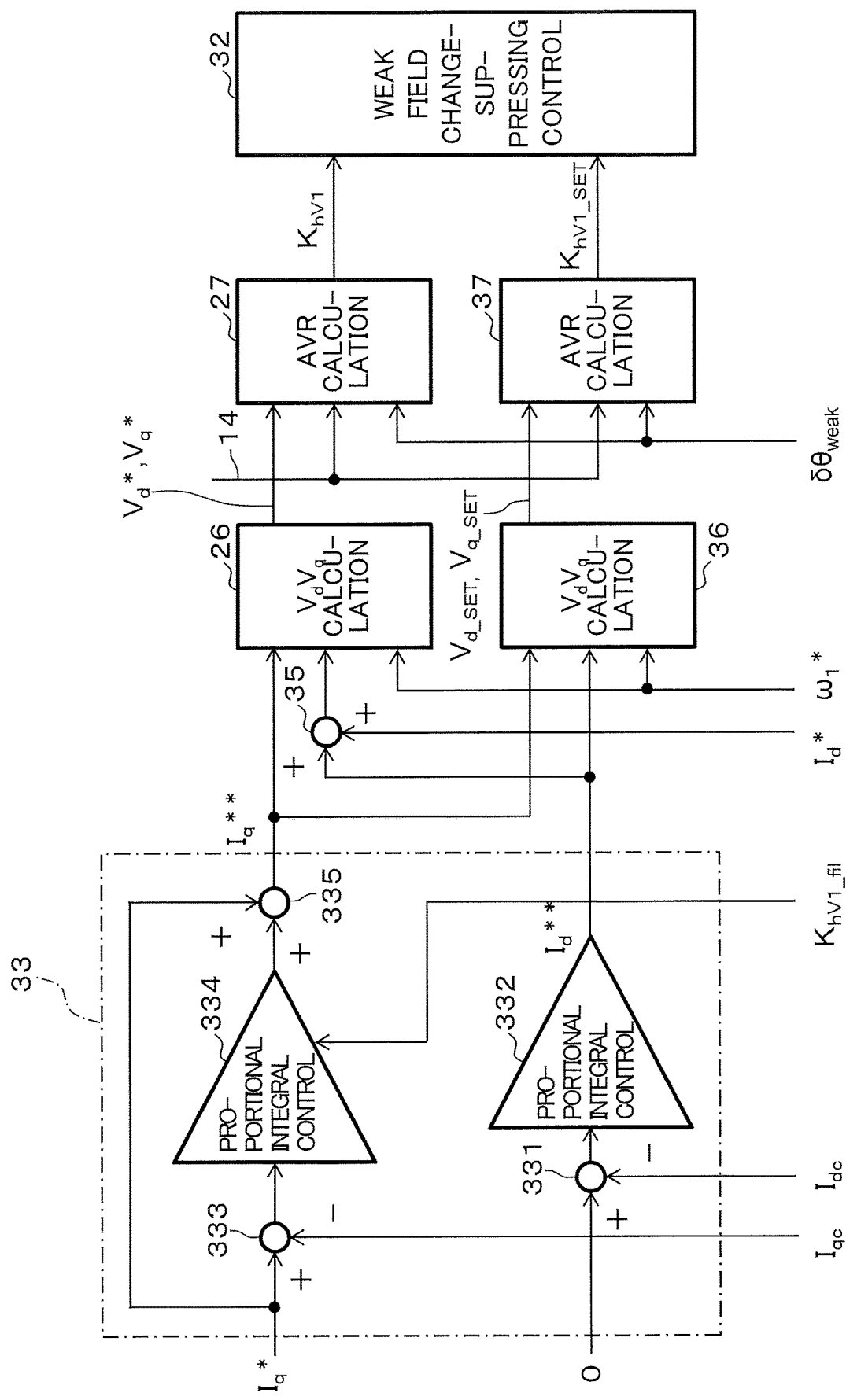
FIG. 13 is a block diagram illustrating a main section of a controller according to a third embodiment.

FIG. 13 is a block diagram illustrating a main section of the algorithm of the controller 12 according to this embodiment. Note that in the description below, elements corresponding to the respective elements of FIGS. 1 to 12 have the same reference numerals so as to avoid redundancy. The configuration of the controller 12 according to this embodiment is substantially the same as of the first embodiment (see FIG. 2). However, a current control unit 33 shown in FIG. 13 is used as an alternative for the current control unit 25 shown in FIG. 2. In addition, as shown in FIG. 13, the controller 12 according to this embodiment includes an adder 35, a $V_d V_q$ controller 36, and an AVR calculator 37.

The current control unit 33 includes subtracters 331 and 333, proportional integral control units 332 and 334, and an adder 335. In the current control unit 33, the subtracter 331 subtracts a d-axis current detection value $I_{dc}$ from 0. The integral control unit 332 executes proportional integral control using a value $(-I_{dc})$ after this subtraction, and the resulting value is output as a second d-axis current command value $I_d^{**}$. Provided that the proportional integral control unit 332 stops its operation when the low range component $K_{hV1\_fil}$ of the motor voltage modulation rate is 1.05 or more. At this time, the integral term is not cleared to 0 and the value is held.

In addition, the adder 35 adds the d-axis current command value $I_d^*$ and the second d-axis current command value $I_d^{}$. Based on the second q-axis current command value $I_q^{}$, the resulting value $(I_d^*+I_d^{**})$ added by the adder 35, and the inverter frequency command value $\omega_1^*$, the VdVq calculator 26 calculates d-axis and q-axis voltage command values $V_d^*$ and $V_q^*$. Specifically, instead of the "$I_d^{**}$" in the above [Expression 3], the "$I_d^*+I_d^{**}$" is used to give the d-axis and q-axis voltage command values $V_d^*$ and $V_q^*$.

Meanwhile, based on the second d-axis current command value $I_d^{}$, the second q-axis current command value $I_q^{}$, and the inverter frequency command value $\omega_1^*$, the $V_d V_q$ calculator 36 calculates a d-axis voltage-determining value $V_{d\_SET}$ and a q-axis voltage-determining value $V_{q\_SET}$. Specifically, the d-axis and q-axis voltage command values $V_d^*$ and $V_q^*$ in [Expression 3] according to the above first embodiment correspond to the d-axis and q-axis voltage-determining values $V_{d\_SET}$ and $V_{q\_SET}$ according to this embodiment, respectively.

Here, the AVR calculator 27 calculates, like calculations using the above [Expression 4], [Expression 5], and [Expression 6], the motor voltage modulation rate $K_{hV1}$. In addition, in the above [Expression 4], [Expression 5], and [Expression 6], the d-axis and q-axis voltage command values $V_d^*$ and $V_q^*$ are replaced by the d-axis and q-axis voltage-determining values $V_{d\_SET}$ and $V_{q\_SET}$ and the motor voltage modulation rate $K_{hV1}$ is replaced by the motor voltage modulation rate-determining value $K_{hV1\_SET}$. Then, the AVR calculator 37 uses the resulting Expressions to calculate the motor voltage modulation rate-determining value $K_{hV1\_SET}$.

The motor voltage modulation rate $K_{hV1}$ and the motor voltage modulation rate-determining vale $K_{hV1\_SET}$ as so calculated are sent to the weak field change-suppressing control unit 32.

If the low range component of the motor voltage modulation rate-determining value $K_{hV1\_SET}$ is less than 1.15 and 1.05 or more, the weak field change-suppressing control unit 32 according to this embodiment calculates the d-axis current command value $I_d^*$ by using the algorithm shown in FIG. 10. The following describes, in detail, processing of this weak field change-suppressing control unit 32.

Figure 14:
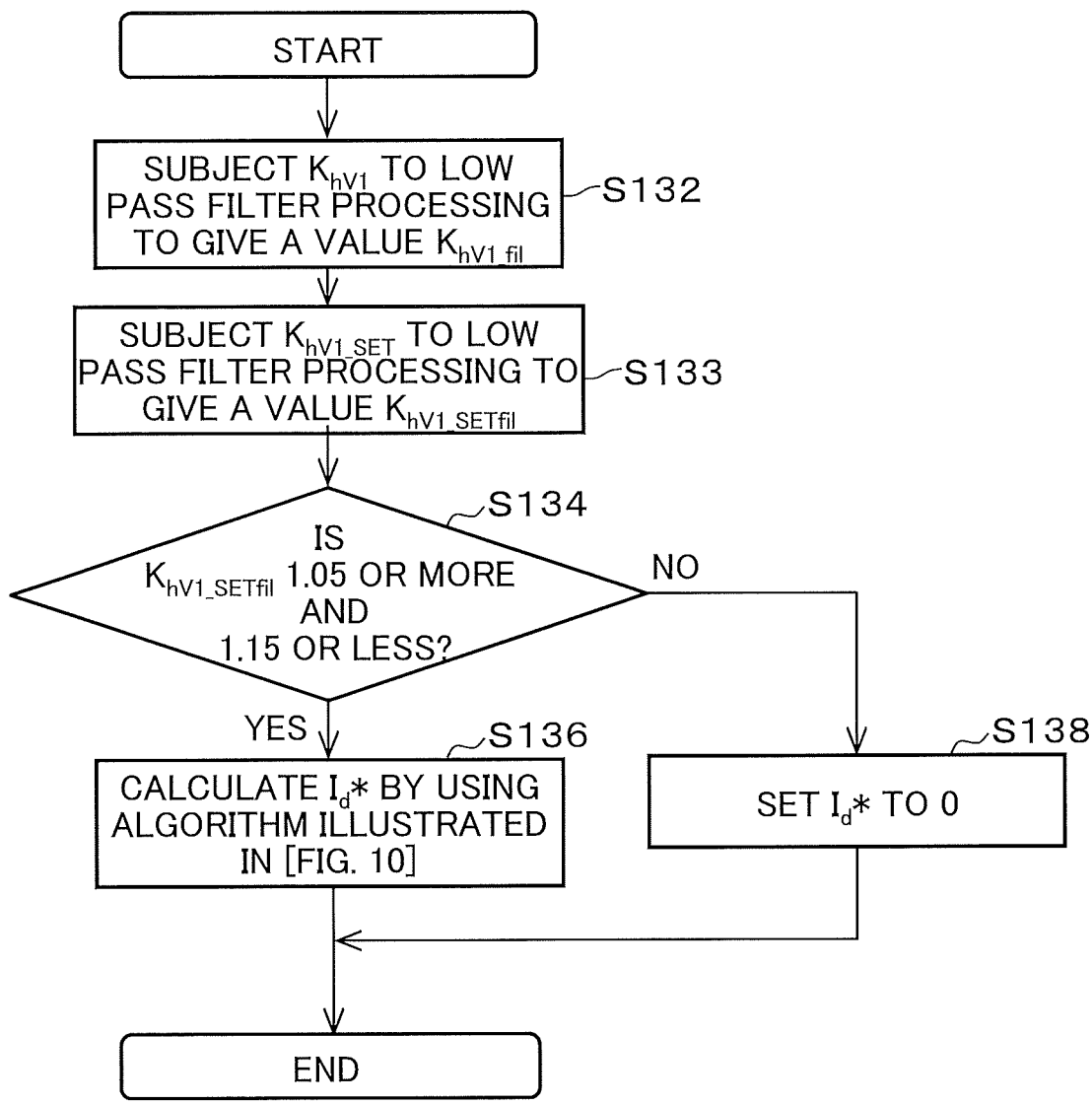
FIG. 14 is a flow chart of a control program executed in a weak field change-suppressing control unit according to the third embodiment.

FIG. 14 is a flow chart of a control program executed in the weak field change-suppressing control unit 32 according to this embodiment instead of the first embodiment (FIG. 6).

When the process goes to Step S132 of FIG. 14, the low range component $K_{hV1\_fil}$ of the motor voltage modulation rate, which component is obtained after the $K_{hV1}$ is subjected to low-pass filter processing, is calculated. Next, when the process goes to Step S133, the low range component $K_{hV1\_SETfil}$ of the motor voltage modulation rate-determining value, which component is obtained after the $K_{hV1\_SET}$ is subjected to low-pass filter processing, is calculated.

Next, when the process goes to Step S134, whether or not the $K_{hV1\_SETfil}$ is 1.05 or more and 1.15 or less is determined. If this step is judged as "YES", the process goes to Step S136 and the weak field change-suppressing control unit 32 uses the algorithm shown in FIG. 10 to calculate the d-axis current command value $I_d^*$. If Step S134 is judged as "NO", the process goes to Step S138 and the weak field change-suppressing control unit 32 sets the d-axis current command value $I_d^*$ to 0.

Figure 15:
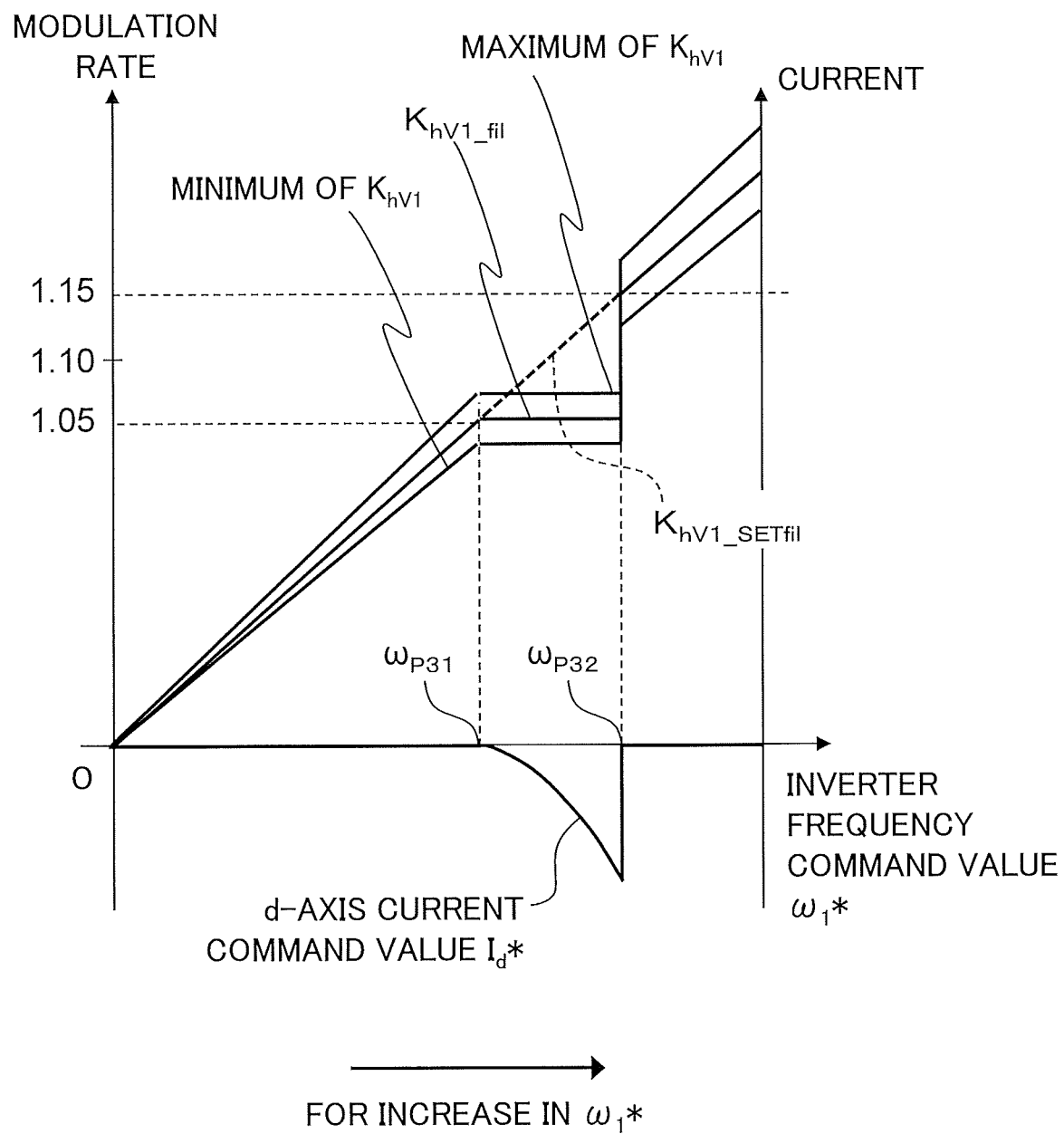
FIG. 15 is a graph showing another relationship among the d-axis current command value, the inverter frequency command value, and the motor voltage modulation rate according to the third embodiment.

FIG. 15 is a graph showing another relationship among the d-axis current command value $I_d^*$, the inverter frequency command value $\omega_1^*$, and the motor voltage modulation rate $K_{hV1}$ according to this embodiment.

Specifically, in FIG. 15, the q-axis current command value $I_q^*$ is kept constant; and while the inverter frequency command value $\omega_1^*$ is increased, indicated are the d-axis current command value $I_d^*$, the maximum/minimum of the motor voltage modulation rate $K_{hV1}$, the low range component $K_{hV1\_fil}$ of the motor voltage modulation rate, and the low range component $K_{hV1\_SETfil}$ of the motor voltage modulation rate-determining value.

In FIG. 15, as the inverter frequency command value $\omega_1^*$ increases, the low range component $K_{hV1\_fil}$ of the motor voltage modulation rate becomes larger. After the $K_{hV1\_fil}$ reaches 1.05, the $K_{hV1\_fil}$ is, for a while, kept at almost the target value 1.05. Here, as the $\omega_1^*$ increases, the $I_d^*$ decreases (the absolute value increases). The frequency $\omega_{P31}$ (first command value) is set to the inverter frequency command value $\omega_1^*$ where the $K_{hV1\_fil}$ arrives at 1.05. Meanwhile, the low range component $K_{hV1\_SETfil}$ of the motor voltage modulation rate-determining value is not affected by the d-axis current command value $I_d^*$. Thus, as shown in a dashed line of FIG. 15, the $K_{hV1\_SETfil}$ continuously increases as the inverter frequency command value $\omega_1^*$ increases.

Next, when the $K_{hV1\_SETfil}$ reaches 1.15, Step S138 of FIG. 14 is executed and the d-axis current command value $I_d^*$ is thus set to 0. Then, the low range component $K_{hV1\_fil}$ of the motor voltage modulation rate abruptly rises. The frequency $\omega_{P32}$ (second command value) is set to the inverter frequency command value $\omega_1^*$ at the timing of the abrupt rise.

In this way, after the $K_{hV1\_fil}$ abruptly rises, the maximum of the motor voltage modulation rate $K_{hV1}$ exceeds 1.15 and the minimum exceeds 1.10 as shown in FIG. 15 where $\omega_1^*>\omega_{P32}$. As described above, when the $K_{hV1}$ reaches 1.15, the weak field control unit 31 switches the $FLG_{weak}$ from OFF to ON; and when the $K_{hV1}$ decreases to 1.10, the weak field control unit 31 switches the $FLG_{weak}$ from ON to OFF. Hence, in FIG. 15 where $\omega_1^*>\omega_{P32}$, the weak field control flag $FLG_{weak}$ is kept ON, so that the $FLG_{weak}$ is switched less frequently.

As described above, according to this embodiment, the d-axis current command unit (32) sets, if the frequency command value ($\omega_1^*$) is less than the first command value ($\omega_{P31}$), the d-axis current command value ($I_d^*$) to 0;

increases, if the frequency command value ($\omega_1^*$) is the first command value ($\omega_{P31}$) or more and less than the predetermined second command value ($\omega_{P32}$), the absolute value of the d-axis current command value ($I_d^*$) as the frequency command value ($\omega_1^*$) becomes larger, so as to keep the output voltage substantially constant; and sets, if the frequency command value ($\omega_1^*$) is the second command value ($\omega_{P32}$) or more, the d-axis current command value ($I_d^*$) to 0.

More specifically, based on the low range component $K_{hV1\_SETfil}$ of the motor voltage modulation rate-determining value, the d-axis current command value $I_d^*$ is set in Steps S136 and S138. This, like the first embodiment, can prevent the flag $FLG_{weak}$ from being switched frequently. Further, the d-axis current command value $I_d^*$ can be set without using the predetermined value $I_{d\_SET}$. Hence, it is possible to mitigate complexities of setting the predetermined value $I_{d\_SET}$ in accordance with the characteristics of the motor 4.

Fourth Embodiment

The following describes, in detail, a motor drive system according to the fourth embodiment of the present invention.

The configuration of this embodiment is similar to that of the first embodiment (FIG. 1), but the algorithm of the controller 12 differs from that of the first embodiment.

Figure 16:
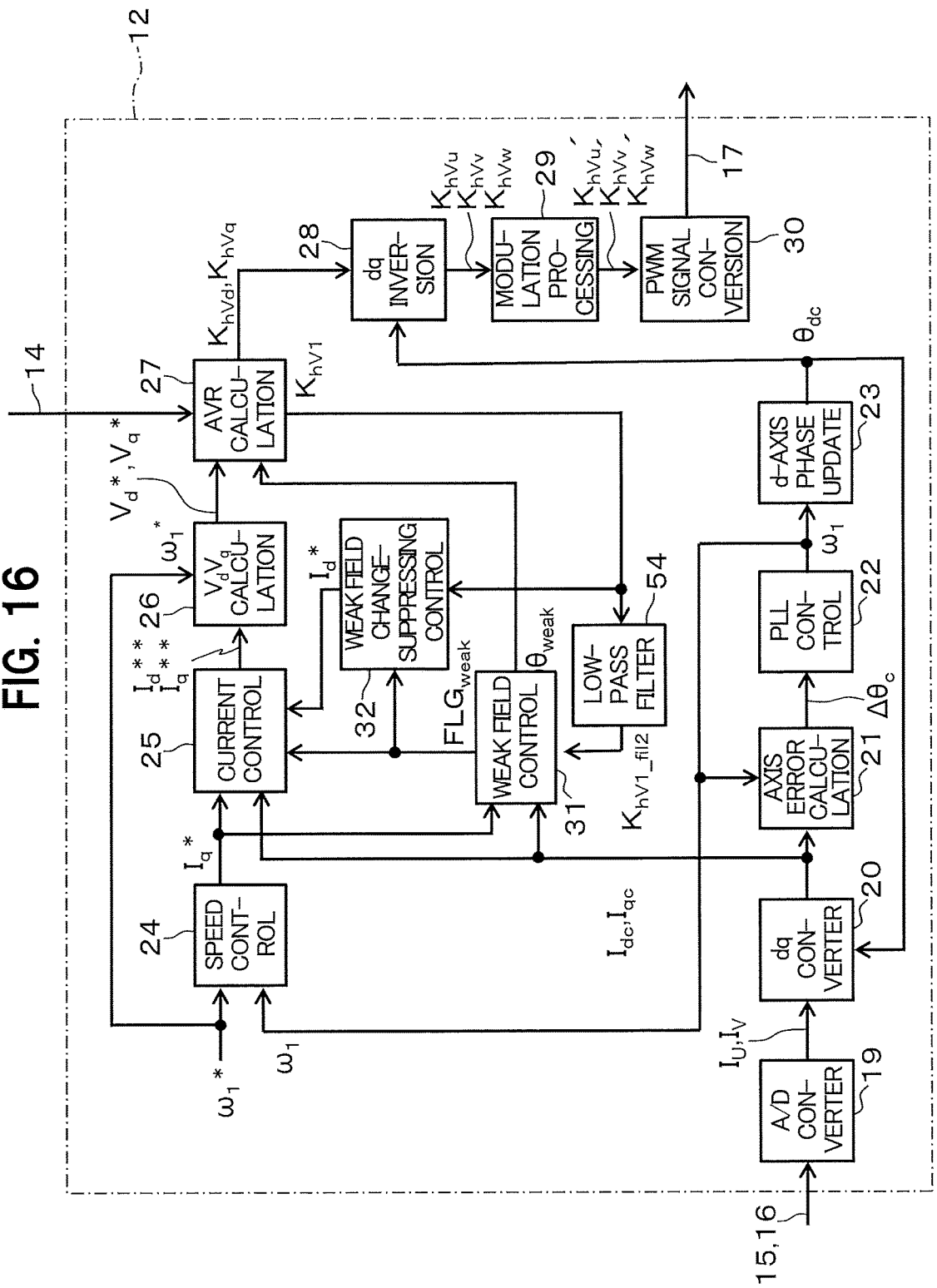
FIG. 16 is a block diagram illustrating a controller according to a fourth embodiment.

FIG. 16 is a block diagram showing the algorithm of the controller 12 and illustrates functional blocks implemented by, for example, the control program. Note that in the description below, elements corresponding to the respective elements of FIGS. 1 to 15 have the same reference numerals so as to avoid redundancy.

In this embodiment, the controller 12 has a low-pass filter 54. The low-pass filter 54 is used to subject the motor voltage modulation rate $K_{hV1}$ to low-pass filter processing so as to output, to the weak field control unit 31, the resulting value as the low range component $K_{hV1\_fil2}$ of the motor voltage modulation rate. The time constant of the low-pass filter 54 is sufficiently larger than the ripple frequency of the DC voltage detection value $V_{dc}$.

In the weak field control unit 31 according to the above first embodiment, when the weak field control flag $FLG_{weak}$ is OFF and the motor flag voltage modulation rate $K_{hV1}$ reaches 1.15, the $FLG_{weak}$ is switched ON; and when the flag $FLG_{weak}$ is ON and the $K_{hV1}$ decreases to 1.10, the flag $FLG_{weak}$ is switched OFF.

By contrast, in the weak field control unit 31 according to this embodiment, when the weak field control flag $FLG_{weak}$ is OFF and the low range component $K_{hV1\_fil2}$ of the motor voltage modulation rate reaches 1.10, the flag $FLG_{weak}$ is switched ON; and when the flag $FLG_{weak}$ is ON and the low range component $K_{hV1\_fil2}$ of the motor voltage modulation rate decreases to 1.05, the flag $FLG_{weak}$ is switched OFF. This point is a difference. The configuration other than the above configuration of the controller 12 is the same as of the first embodiment (see FIG. 2).

Based on the low range component $K_{hV1\_fil2}$ of the motor voltage modulation rate, which component is obtained after the motor voltage modulation rate $K_{hV1}$ is subjected beforehand to low-pass filter processing, the weak field control unit 31 according to this embodiment sets the ON/OFF state of the weak field control flag $FLG_{weak}$. Accordingly, the flag $FLG_{weak}$ is switched less frequently.

Provided that for instance, when the motor voltage modulation rate $K_{hV1}$ abruptly rises, a response of the low range component $K_{hV1\_fil2}$ of the motor voltage modulation rate may be delayed. It is assumed that in this embodiment, the "1.15", which is identical to that of the first embodiment, is used as a threshold at which the flag $FLG_{weak}$ is set to ON. In this case, although the output voltage of the inverter device 3 is saturated, the flag $FLG_{weak}$ is not switched ON. Consequently, the problem may occur where the weak field change-suppressing control unit 32 cannot adjust the weak field control voltage-manipulating variable $\delta\theta_{weak}$.

In this embodiment, when the low range component $K_{hV1\_fil2}$ of the motor voltage modulation rate reaches 1.10, the flag $FLG_{weak}$ is switched ON as described above. Thus, before the motor voltage modulation rate $K_{hV1}$ reaches 1.15, the flag $FLG_{weak}$ can be actually switched ON. This can prevent the occurrence of the state where the weak field control voltage-manipulating variable $\delta\theta_{weak}$ cannot be adjusted while the output voltage of the inverter device 3 is saturated.

As described above, the controller (12) according to this embodiment includes: the low-pass filter (54) into which a value ($K_{hV1}$) changed in response to a change in the DC voltage ($V_{dc}$) is input; and the weak field control unit (31) configured to determine, based on the output signal from the low-pass filter (54), whether or not the weak field control is executed. This, like the first embodiment, enables the motor 4 to be driven stably.

Fifth Embodiment

The following describes, in detail, a motor drive system according to the fifth embodiment of the present invention. Note that in the description below, elements corresponding to the respective elements of FIGS. 1 to 16 have the same reference numerals so as to avoid redundancy.

The configuration of this embodiment is the same as of the first embodiment (FIGS. 1 and 2). However, as a control program executed in the weak field change-suppressing control unit 32, used is one illustrated in FIG. 17 instead of the program according to the first embodiment (FIG. 6).

Figure 17:
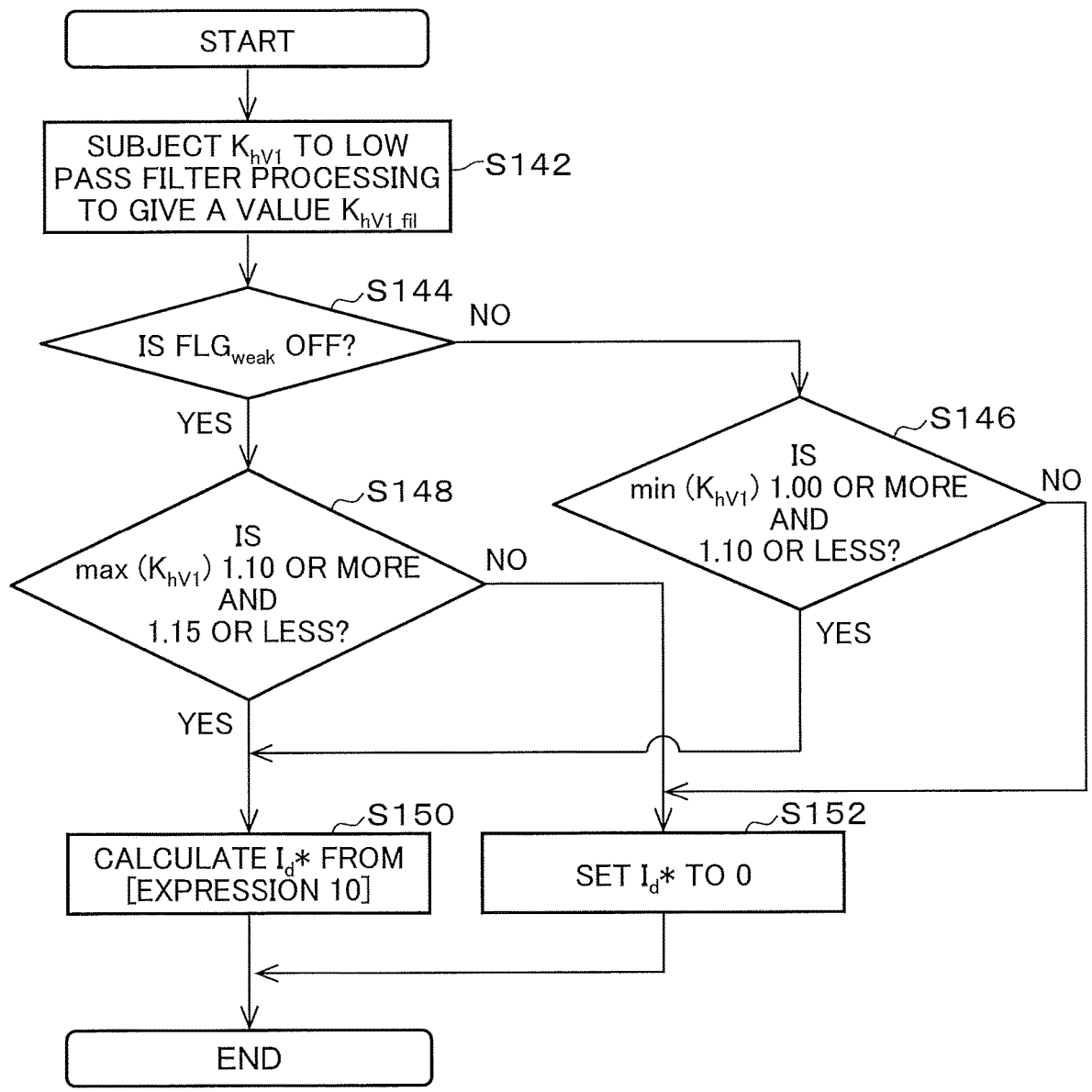
FIG. 17 is a flow chart of a control program executed in a weak field change-suppressing control unit according to a fifth embodiment.

When the process goes to Step S142 of FIG. 17, the low range component $K_{hV1\_fil}$ of the motor voltage modulation rate, which component is obtained after the $K_{hV1}$ is subjected to low-pass filter processing, is calculated. Next, when the process goes to Step S144, it is determined whether or not the weak field control flag $FLG_{weak}$ is OFF. If Step S144 is judged as "YES", the process goes to Step S148. Here, it is determined whether or not the maximum max ($K_{hV1}$) of the motor voltage modulation rate $K_{hV1}$ during a past predetermined period (e.g., 20 milliseconds) is 1.10 or more and 1.15 or less.

If Step S148 is judged as "YES", the process goes to Step S150 and the d-axis current command value $I_d^*$ is calculated based on the above [Expression 10]. Then, the process of this routine is ended. By contrast, if Step S148 is judged as "NO", the process goes to Step S152 and the d-axis current command value $I_d^*$ is set to 0. Then, the process of this routine is ended.

If the flag $FLG_{weak}$ is ON, the process goes to Step S146. Here, it is determined whether or not the minimum min ($K_{hV1}$) of the motor voltage modulation rate $K_{hV1}$ during a past predetermined period (e.g., 20 milliseconds) is 1.00 or more and 1.10 or less. If Step S146 is judged as "YES", the process goes to Step S150 and the d-axis current command value $I_d^*$ is calculated based on the above [Expression 10]. Then, the process of this routine is ended. By contrast, if Step S146 is judged as "NO", the process goes to Step S152 and the d-axis current command value $I_d^*$ is set to 0. Then, the process of this routine is ended.

As described above, in this embodiment, the d-axis current command value ($I_d^*$) can be controlled based on the minimum min ($K_{hV1}$) and the maximum max ($K_{hV1}$) of the motor voltage modulation rate $K_{hV1}$ during the past predetermined period.

This, like the first embodiment, enables the motor 4 to be driven stably.

Sixth Embodiment

The following describes, in detail, a motor drive system according to the sixth embodiment of the present invention. Note that in the description below, elements corresponding to the respective elements of FIGS. 1 to 17 have the same reference numerals so as to avoid redundancy.

The configuration of this embodiment is substantially the same as of the first embodiment (FIGS. 1 and 2). However, as a control program executed in the weak field change-suppressing control unit 32, used is one illustrated in FIG. 18 instead of the program according to the first embodiment (FIG. 6).

Figure 18:
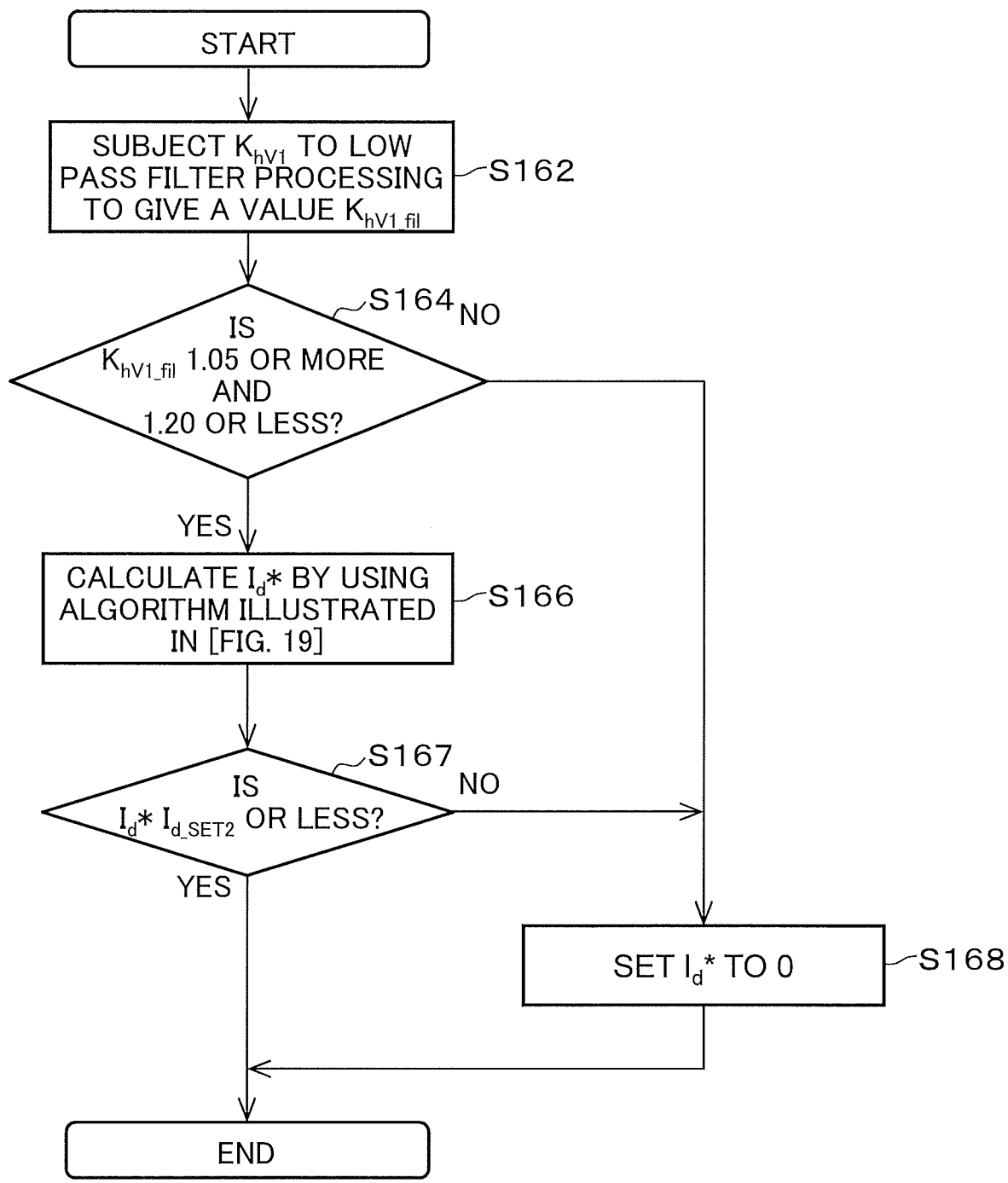
FIG. 18 is a flow chart of a control program executed in a weak field change-suppressing control unit according to a sixth embodiment.

When the process goes to Step S162 of FIG. 18, the low range component $K_{hV1\_fil}$ of the motor voltage modulation rate, which component is obtained after the $K_{hV1}$ is subjected to low-pass filter processing, is calculated. Next, when the process goes to Step S164, it is determined whether or not the low range component $K_{hV1\_fil}$ of the motor voltage modulation rate is 1.05 or more and 1.20 or less. If this step is judged as "YES", the process goes to Step S166 and the weak field change-suppressing control unit 32 uses the algorithm (its details are described below) shown in FIG. 19 to calculate the d-axis current command value $I_d^*$.

Next, when the process goes to Step S167, it is determined whether or not the d-axis current command value $I_d^*$ calculated is a predetermined value $I_{d\_SET2}$ (its details are described below) or less. If this step is judged as "YES", the process of this routine is ended and the d-axis current command value $I_d^*$ calculated in the previous Step S166 is used. Alternatively, if either Step S164 or Step S167 is judged as "NO", the process goes to Step S168 and the weak field change-suppressing control unit 32 sets the d-axis current command value $I_d^*$ to 0.

Figure 19:
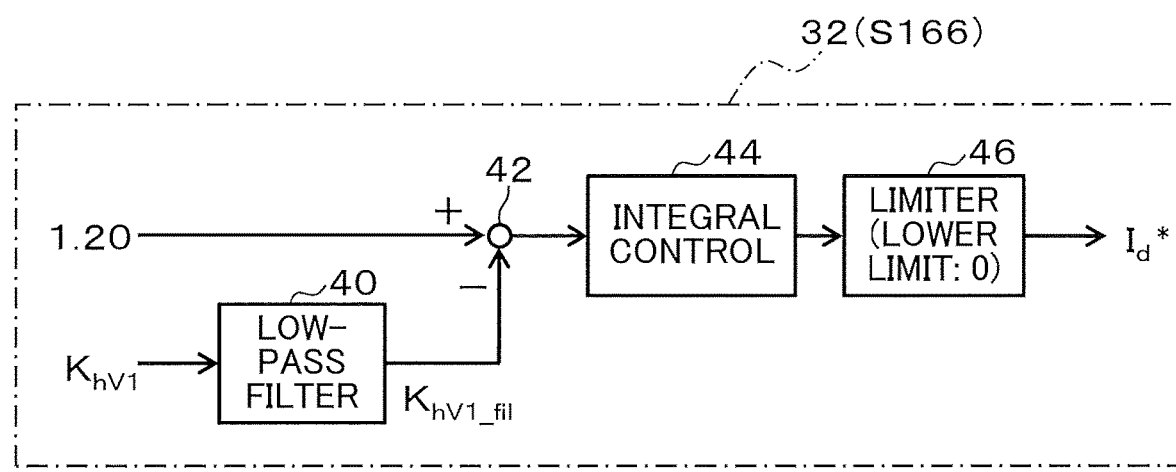
FIG. 19 is a block diagram illustrating a main section of the weak field change-suppressing control unit according to the sixth embodiment.

FIG. 19 is a block diagram illustrating a main section of the weak field change-suppressing control unit 32 according to this embodiment.

In FIG. 19, the low-pass filter (LPF) 40 is used to subject the motor voltage modulation rate $K_{hV1}$ to low-pass filter processing so as to output the low range component $K_{hV1\_fil}$ of the motor voltage modulation rate. The subtracter 42 subtracts the low range component $K_{hV1\_fil}$ of the motor voltage modulation rate from a target value 1.20. The integral control unit 44 executes proportional integral control using a value after this subtraction. The limiter processing unit 46 executes limiter processing such that the lower limit of the output signal from the integral control unit 44 is set to 0. Then, the resulting value is output as the d-axis current command value $I_d^*$.

According to the algorithm of FIG. 19, the integral control unit 44 controls the d-axis current command value $I_d^*$ so as to make the low range component $K_{hV1\_fil}$ of the motor voltage modulation rate closer to the target value 1.20. This enables the low range component $K_{hV1\_fil}$ of the motor voltage modulation rate to be kept almost constant (at a value at or near the target value 1.20) regardless of the characteristics of the motor 4.

Figure 20:
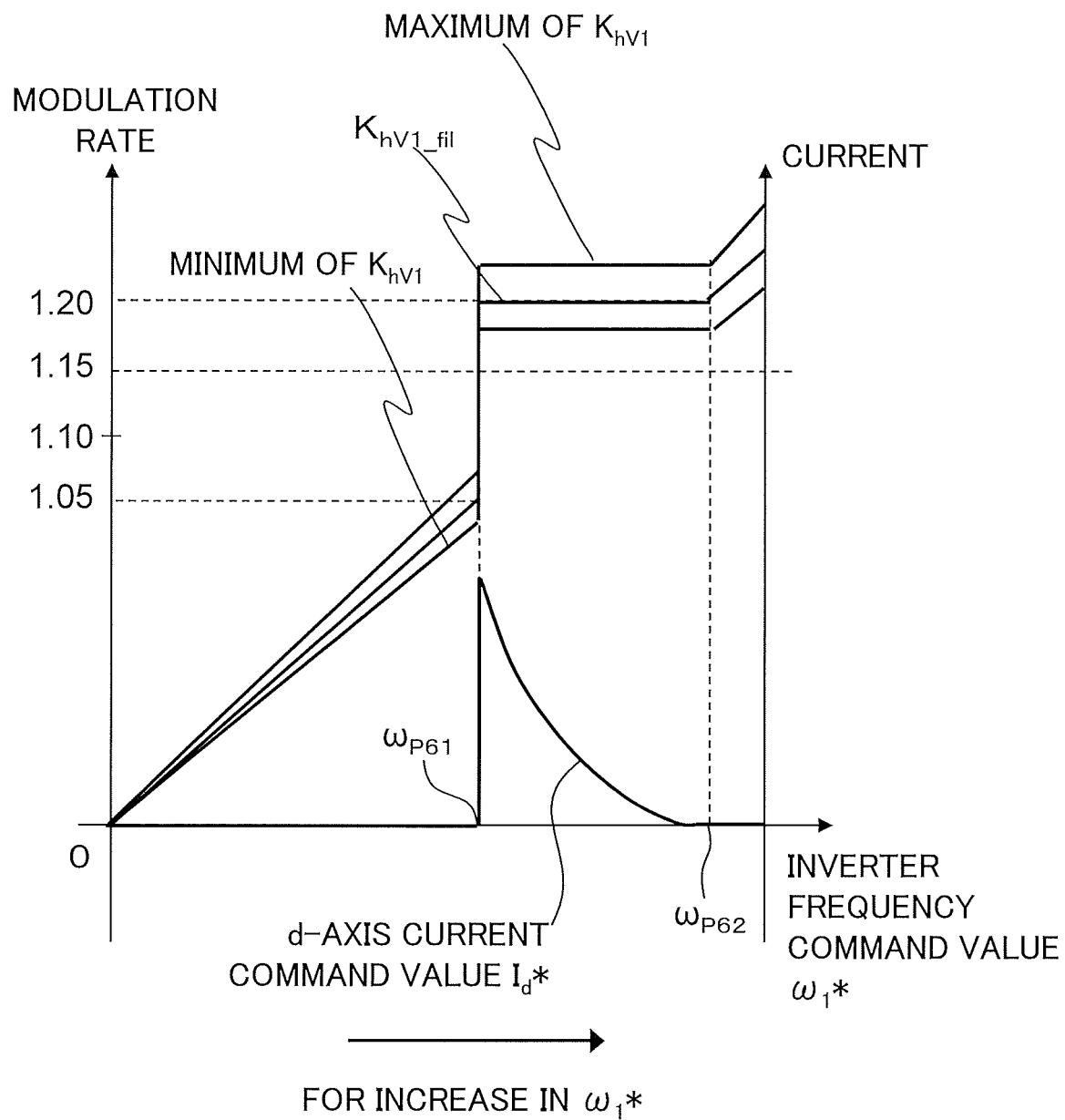
FIG. 20 is a graph showing another relationship among the d-axis current command value, the inverter frequency command value, and the motor voltage modulation rate according to the sixth embodiment.

FIG. 20 is a graph showing the relationship among the d-axis current command value $I_d^*$, the inverter frequency command value $\omega_1^*$, and the motor voltage modulation rate $K_{hV1}$ according to this embodiment.

Specifically, in FIG. 20 like the above FIGS. 7 and 11, the q-axis current command value $I_q^*$ is kept constant; and while the inverter frequency command value $\omega_1^*$ is increased, indicated are the d-axis current command value $I_d^*$, the maximum/minimum of the motor voltage modulation rate $K_{hV1}$, and the low range component $K_{hV1\_fil}$ of the motor voltage modulation rate. In FIG. 20, as the inverter frequency command value $\omega_1^*$ increases, the low range component $K_{hV1\_fil}$ of the motor voltage modulation rate becomes larger. When the $K_{hV1\_fil}$ is less than 1.05, the above Step S164 and S168 (see FIG. 18) are executed and the d-axis current command value $I_d^*$ is set to 0.

Once the low range component $K_{hV1\_fil}$ of the motor voltage modulation rate is 1.05, Step S164 is then judged as "YES" and Step S166 is executed. Accordingly, the algorithm of FIG. 19 is used to calculate the d-axis current command value $I_d^*$ such that the low range component $K_{hV1\_fil}$ of the motor voltage modulation rate is about 1.20. As long as the calculated $I_d^*$ is the predetermined value $I_{d\_SET2}$ or less, this calculated $I_d^*$ is supplied, as it is, to the current control unit 25 (see FIG. 16). Note that the predetermined value $I_{d\_SET2}$ is a value at which various defects may occur after the $I_d^*$ is increased to that value or more, and should be adjusted in accordance with the characteristics of the motor 4.

In the instance of FIG. 20, when the low range component $K_{hV1\_fil}$ of the motor voltage modulation rate is 1.05, the $K_{hV1\_fil}$ abruptly rises and reaches 1.20. The frequency $\omega_{P61}$ is set to the inverter frequency command value $\omega_1^*$ where the $K_{hV1\_fil}$ abruptly rises. At the frequency $\omega_{P61}$, the d-axis current command value $I_d^*$ also steeply increases so as to achieve the $K_{hV1\_fil}=1.20$. In the previous embodiments such as the first embodiment (see FIG. 7), the case where the d-axis current command value $I_d^*$ is set to a value other than 0 means the case where "a magnetic flux that weakens the magnetic flux of the permanent magnets of the motor 4 is generated". Thus, the d-axis current command value $I_d^*$ is set to be a negative value. However, in this embodiment, the d-axis current command value $I_d^*$ is set to be a positive value as shown in FIG. 20.

Here, as shown in FIG. 20, when the frequency is at $\omega_{P61}$, the maximum of the motor voltage modulation rate $K_{hV1}$ exceeds 1.15 and the minimum exceeds 1.10. As described above, when the $K_{hV1}$ reaches 1.15, the weak field control unit 31 switches the $FLG_{weak}$ from OFF to ON; and when the $K_{hV1}$ decreases to 1.10, the weak field control unit 31 switches the $FLG_{weak}$ from ON to OFF. Hence, in FIG. 20 where $\omega_1^* > \omega_{P61}$, the weak field control flag $FLG_{weak}$ is kept ON, so that the $FLG_{weak}$ is switched less frequently.

When the inverter frequency command value $\omega_1^*$ further increases and becomes larger than $\omega_{P61}$, a smaller $I_d^*$ can be used to achieve the $K_{hV1\_fil}=1.20$. Accordingly, as the $\omega_1^*$ increases, the $I_d^*$ decreases. If the d-axis current command value $I_d^*$ arrives at the lower limit (0) and the low range component $K_{hV1\_fil}$ of the motor voltage modulation rate exceeds 1.20, Step S164 (see FIG. 18) is judged as "NO". Then, at Step S168, the $I_d^*$ is set to 0. The frequency $\omega_{P62}$ is referred to as the inverter frequency command value $\omega_1^*$ at which the low range component $K_{hV1\_fil}$ of the motor voltage modulation rate starts rising again and is beyond 1.20.

Note that at Step S166 of FIG. 18, the d-axis current command value $I_d^*$ is calculated based on the algorithm of FIG. 19. However, like [Expression 10] of the first embodiment, for instance, the d-axis current command value $I_d^*$ may be calculated by using the proportional gain K in "$I_d^*=(1.20-K_{hV1\_fil})\times K$".

According to this embodiment as described above, the d-axis current command unit (32) controls, when the output voltage is lower than the saturation level, the d-axis current command value ($I_d^*$) such that a magnetic flux that strengthens a magnetic flux generated by the permanent magnets is generated in the windings.

This, like the first embodiment, enables the motor 4 to be driven stably.

Seventh Embodiment

The following describes how to configure an air conditioner W according to the seventh embodiment of the present invention. In the description below, elements corresponding to the respective elements of FIGS. 1 to 20 have the same reference numerals so as to avoid redundancy.

Figure 21:
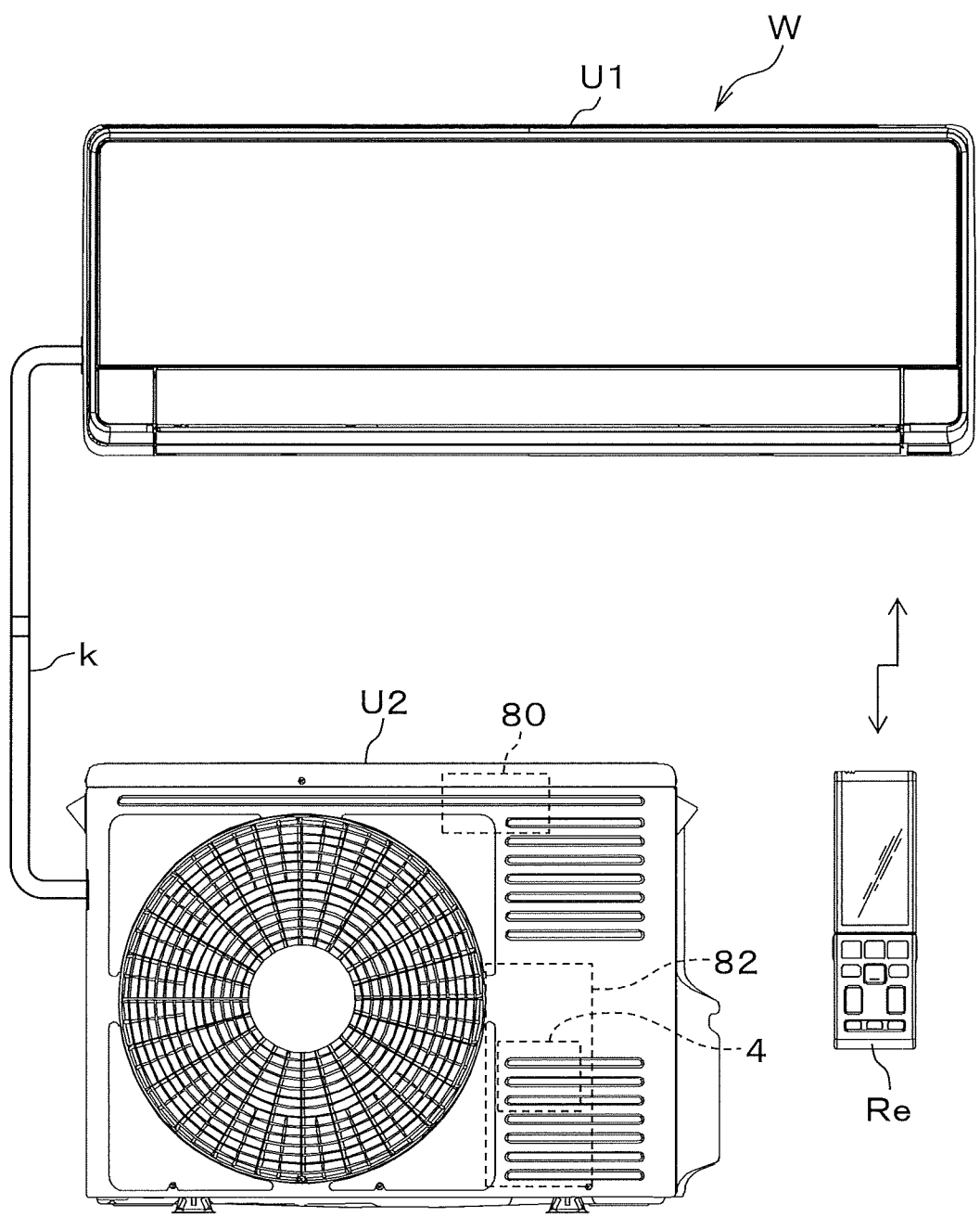
FIG. 21 is a schematic view of an air conditioner according to a seventh embodiment.

FIG. 21 is a schematic view of the air conditioner W according to the seventh embodiment. As depicted, the air conditioner W includes an indoor unit U1, an outdoor unit U2, a pipe k connecting therebetween, and a remote controller Re. The air conditioner W is an apparatus through which a heat-transfer medium circulates using a well-known heat pump cycle so as to execute air conditioning (e.g., cooling operation, heating operation, dehumidification operation). The remote controller Re is to send or receive various predetermined signals (e.g., to give an operation/stop command, to change a set temperature, to set a timer, to change an operation mode) to or from the indoor unit U1.

The outdoor unit U2 includes an electronics case 80 that houses various electronics and a compressor 82. Here, the electronics case 80 includes the converter circuit 2 (see FIG. 1) and the inverter device 3 (see FIG. 1) according to any one of the above first to sixth embodiments. In addition, the inside of the compressor 82 is provided with the above-described motor 4.

Hence, in the air conditioner W according to this embodiment, like the above first to sixth embodiments, the flag $FLG_{weak}$ can be prevented from being switched frequently, which allows for continuously stable operation.

Modification Embodiments

The present invention is not limited to the above embodiments, and various modifications are allowed. The above-described embodiments are just examples so as to explain the present invention in an understandable manner. Thus, the present invention is not necessarily limited to embodiments including all the elements described. In addition, part of the configuration of a certain embodiment may be replaced by the configuration of another embodiment. Further, the configuration of a certain embodiment may be added to the configuration of another embodiment. Furthermore, any part of the configuration of each embodiment may be deleted or may be added to or replaced by another configuration. Meanwhile, control lines and/or information lines shown in the drawings indicate what is considered to be necessary for description, so that they may not represent all the control lines and/or information lines required for the products. In fact, almost all the configurations may be connected to one another. Examples of a possible modification regarding the above embodiments include the following.

(1) Hardware of the controller 12 according to each embodiment can be realized by a common computer. Thus, any of the programs of the flow charts shown in FIGS. 6, 9, 14, 17, and 18 and table and file information may be stored in storage devices such as a memory, a hard disk, an SSD (solid state drive) or storage media such as an IC card, an SD card, and a DVD, or may be deployed using a communication path.

(2) The processing shown in each of FIGS. 6, 9, 14, 17, and 18 is described as software processing using a program in each embodiment. However, part or all of them may be replaced by hardware processing using, for example, ASIC (Application Specific Integrated Circuit; IC for a specific purpose) or FPGA (field-programmable gate array).

(3) In addition, the inverter device 3 according to any one of the first to sixth embodiments may be used for not only the air conditioner W according to the seventh embodiment but also various electric devices such as ventilation fans, freezers, washing machines, cleaners, industrial machines, electric vehicles, railway vehicles, ships, elevators, and escalators. By using the inverter device, these electric devices can exert excellent performance depending on their usage.

REFERENCE SIGNS LIST

3 Inverter device (power conversion device)
4 Permanent magnet synchronous motor (motor)
9 IPM (inverter)
12 Controller
24 Speed control unit (q-axis current command unit)
31 Weak field control unit
32 Weak field change-suppressing control unit (d-axis current command unit)
40, 54 Low-pass filter
82 Compressor
$\omega_1^*$ Inverter frequency command value (frequency command value)
$\omega_{P31}$ Frequency (first command value)
$\omega_{P32}$ Frequency (second command value)
$I_d^*$ d-Axis current command value
$I_1^*$ q-Axis current command value
$V_{dc}$ DC voltage detection value
W Air conditioner

The invention claimed is:

1. A power conversion device comprising:
an inverter which converts, in order to drive a motor equipped with a stator having windings and a rotor having permanent magnets, supplied DC voltage to an AC output voltage and supplies the AC output voltage to the windings, wherein, a saturation level at which the output voltage is saturated changes in accordance with the DC voltage; and
a controller which, when the output voltage is lower than the saturation level, increases an output current of the inverter to generate, in the windings, a magnetic flux in such a direction as to weaken or strengthen a magnetic flux generated by the permanent magnets,
wherein the controller comprises: when in a coordinate system that rotates at a rotation speed of an electrical angle of the motor, a d-axis is set to a direction of a magnetic flux generated by the permanent magnets and a q-axis is set to an axis orthogonal with the d-axis,
a q-axis current command unit configured to output a q-axis current command value, which is a command value for a q-axis component of the output current, based on a frequency command value; and
a d-axis current command unit configured to output a d-axis current command value, which is a command value for a d-axis component of the output current, based on the frequency command value, wherein the d-axis current command unit controls, when the output voltage is lower than the saturation level, the d-axis current command value to generate in the windings a magnetic flux in such a direction as to weaken the magnetic flux generated by the permanent magnets, wherein the d-axis current command unit sets, when the frequency command value is less than a first command value, the d-axis current command value to 0; increases, when the frequency command value is the first command value or more and less than a predetermined second command value, an absolute value of the d-axis current command value as the frequency command value becomes larger, so as to keep the output voltage substantially constant; and sets, when the frequency command value is the second command value or more, the d-axis current command value to 0.

2. The power conversion device according to claim 1, wherein the d-axis current command unit controls the d-axis current command value to keep the output voltage substantially constant while the frequency command value changes.

3. The power conversion device according to claim 1, wherein the controller comprises: a low-pass filter into which a value changes in response to a change in the DC voltage is input; and a weak field control unit configured to determine, based on an output signal from the low-pass filter, whether or not weak field control is executed.

4. The power conversion device according to claim 1, wherein the d-axis current command unit controls, when the output voltage is lower than the saturation level, the d-axis current command value to generate in the windings a magnetic flux in such a direction as to strengthen the magnetic flux generated by the permanent magnets.

5. An air conditioner comprising:

a compressor having a motor equipped with a stator having windings and a rotor having permanent magnets;

an inverter which converts supplied DC voltage to an AC output voltage and supplies the AC output voltage to the windings, wherein a saturation level at which the output voltage is saturated, changes in accordance with the DC voltage; and a controller which, when the output voltage is lower than the saturation level, increases an output current of the inverter to generate, in the windings, a magnetic flux in such a direction as to weaken or strengthen a magnetic flux generated by the permanent magnets wherein the controller comprises: when in a coordinate system that rotates at a rotation speed of an electrical angle of the motor, a d-axis is set to a direction of a magnetic flux generated by the permanent magnets and a q-axis is set to an axis orthogonal with the d-axis, a q-axis current command unit configured to output a q-axis current command value, which is a command value for a q-axis component of the output current, based on a frequency command value; and a d-axis current command unit configured to output a d-axis current command value, which is a command value for a d-axis component of the output current, based on the frequency command value, wherein the d-axis current command unit controls, when the output voltage is lower than the saturation level, the d-axis current command value to generate in the windings a magnetic flux in such a direction as to weaken the magnetic flux generated by the permanent magnets, wherein the d-axis current command unit sets, when the frequency command value is less than a first command value, the d-axis current command value to 0; increases, when the frequency command value is the first command value or more and less than a predetermined second command value, an absolute value of the d-axis current command value as the frequency command value becomes larger, so as to keep the output voltage substantially constant; and sets, when the frequency command value is the second command value or more, the d-axis current command value to 0.

* * * * *